US010222195B2

(12) United States Patent
Igari

(10) Patent No.: US 10,222,195 B2
(45) Date of Patent: Mar. 5, 2019

(54) INFORMATION PROCESSING APPARATUS, METHOD, PROGRAM, AND RECORDING MEDIUM

(71) Applicant: Sony Corporation, Tokyo (JP)

(72) Inventor: Tatsuya Igari, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 335 days.

(21) Appl. No.: 14/241,196

(22) PCT Filed: Sep. 21, 2012

(86) PCT No.: PCT/JP2012/074145
§ 371 (c)(1),
(2) Date: Feb. 26, 2014

(87) PCT Pub. No.: WO2013/047336
PCT Pub. Date: Apr. 4, 2013

(65) Prior Publication Data
US 2014/0225629 A1 Aug. 14, 2014

(51) Int. Cl.
G06F 1/16 (2006.01)
G06F 3/044 (2006.01)
G01B 7/14 (2006.01)

(52) U.S. Cl.
CPC ............. *G01B 7/14* (2013.01); *G06F 1/1616* (2013.01); *G06F 1/1643* (2013.01); *G06F 1/1677* (2013.01); *G06F 1/1692* (2013.01); *G06F 3/044* (2013.01)

(58) Field of Classification Search
CPC ....... G01B 7/14; G06F 1/1692; G06F 1/1616; G06F 1/1677; G06F 1/1643; G06F 3/044

USPC .......................................................... 324/662
See application file for complete search history.

(56) References Cited

U.S. PATENT DOCUMENTS

2010/0182265 A1* 7/2010 Kim ...................... G06F 1/1616
345/173
2011/0169754 A1* 7/2011 Miyazawa ............ G06F 1/1616
345/173

FOREIGN PATENT DOCUMENTS

JP 2005-528841 9/2005
JP 2006-237812 9/2006
JP 2009-159416 7/2009
JP 2009-253772 10/2009

(Continued)

Primary Examiner — Patrick Assouad
Assistant Examiner — Khristopher Yodichkas
(74) Attorney, Agent, or Firm — Paratus Law Group, PLLC

(57) ABSTRACT

The present technique relates to an information processing apparatus, a method, a program, and a recording medium that can prevent malfunctions. An information processing apparatus includes at least two surfaces, in which the relative position between one surface and the other surface of the two surfaces is changed. The information processing apparatus includes a detecting unit that detects that a relative position between the two surfaces is changed, from a change in a plurality of values of the sensors included in a predetermined region of at least one surface of the two surfaces. When it is detected that the relative position between the two surfaces is changed, an event is not notified to an operating system, for example, and an application is prevented from malfunctioning. The present technique is applicable to an information processing apparatus including two touch panels, for example.

9 Claims, 22 Drawing Sheets

(56) References Cited

FOREIGN PATENT DOCUMENTS

| JP | 2011-503933 | 1/2011 |
| JP | 2011-061316 | 3/2011 |

\* cited by examiner

| | 00 | 01 | 02 | 03 | 04 | 05 | 06 | 07 | 08 | 09 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| 90° | 61 | 62 | 77 | 62 | 69 | 74 | 5a | 68 | 6b | 5a | 5d | 60 | 5f | 6a | 60 | 63 | 67 | 6a | 64 | 6a | 6a | 4f |
| 75° | 64 | 62 | 78 | 63 | 68 | 75 | 5b | 67 | 6c | 5b | 5c | 60 | 5d | 6a | 62 | 64 | 66 | 6a | 65 | 69 | 6a | 50 |
| 60° | 65 | 62 | 79 | 64 | 69 | 75 | 5c | 68 | 6d | 5c | 5e | 62 | 5f | 6c | 63 | 66 | 68 | 6b | 66 | 6a | 6c | 51 |
| 45° | 65 | 65 | 7a | 66 | 6a | 77 | 5e | 6a | 6e | 5e | 5f | 65 | 60 | 6d | 64 | 68 | 6a | 6c | 68 | 6d | 6c | 52 |
| 30° | 67 | 67 | 7c | 69 | 6c | 78 | 61 | 6c | 71 | 61 | 62 | 69 | 63 | 70 | 66 | 6b | 6c | 6f | 6a | 6e | 6e | 53 |
| 15° | 6b | 6a | 81 | 6c | 71 | 7d | 65 | 71 | 76 | 65 | 66 | 6d | 69 | 76 | 6c | 6f | 71 | 74 | 6e | 73 | 73 | 58 |
| 0° | 79 | 76 | 90 | 7c | 7f | 8d | 75 | 80 | 86 | 75 | 75 | 7f | 7a | 87 | 7c | 80 | 7f | 84 | 7e | 80 | 82 | 68 |

FIG. 12

| | 00 | 01 | 02 | 03 | 04 | 05 | 06 | 07 | 08 | 09 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| 75°–90° | 03 | 00 | 01 | 01 | −1 | 01 | 01 | −1 | 01 | 01 | −1 | 00 | −2 | 00 | 02 | 01 | −1 | 00 | 01 | −1 | 00 | 01 |
| 60°–75° | 01 | 00 | 01 | 01 | 01 | 00 | 01 | 01 | 01 | 01 | 02 | 02 | 02 | 02 | 01 | 02 | 02 | 01 | 01 | 01 | 02 | 01 |
| 45°–60° | 00 | 03 | 01 | 02 | 01 | 02 | 02 | 02 | 02 | 02 | 01 | 03 | 01 | 01 | 01 | 02 | 02 | 01 | 02 | 01 | 00 | 01 |
| 30°–45° | 02 | 02 | 02 | 03 | 02 | 01 | 03 | 02 | 03 | 03 | 03 | 04 | 03 | 03 | 02 | 03 | 02 | 03 | 02 | 01 | 02 | 00 |
| 15°–30° | 03 | 03 | 05 | 03 | 05 | 05 | 04 | 05 | 05 | 04 | 04 | 04 | 06 | 06 | 06 | 04 | 05 | 05 | 04 | 05 | 05 | 05 |
| 00°–15° | 14 | 12 | 15 | 16 | 14 | 16 | 16 | 15 | 16 | 16 | 15 | 18 | 17 | 17 | 16 | 17 | 14 | 16 | 16 | 13 | 15 | 16 |

14-1

14-2

INFORMATION PROCESSING APPARATUS, METHOD, PROGRAM, AND RECORDING MEDIUM

CROSS REFERENCE TO PRIOR APPLICATION

This application is a National Stage Patent Application of PCT International Patent Application No. PCT/JP2012/074145 (filed on Sep. 21, 2012) under 35 U.S.C. § 371, which claims priority to Japanese Patent Application No. 2011-213868 (filed on Sep. 29, 2011), which are all hereby incorporated by reference in their entirety.

TECHNICAL FIELD

The present technique relates to an information processing apparatus, a method, a program, and a recording medium. More specifically, the present technique relates to an information processing apparatus, a method, a program, and a recording medium that prevent malfunctions.

BACKGROUND ART

Portable devices such as a cellular telephone, a game machine, and a personal computer, for example, are popular. Although limitations are imposed on the sizes of the displays of these devices because the devices are portable, users demand a large screen as large as possible. Therefore, there is a device in which a terminal is foldably configured and the size of the display is secured. Among such devices, there is a device configured in which one part is a display and the other part is a manipulation member such as buttons when the device is opened.

A device mounted with a touch panel is also popular. The touch panel is often integrally formed on a display and configured to manipulate icons, for example, displayed on the display. There is also a portable terminal including such a touch panel. Patent Document 1 describes a cellular telephone including a touch panel. When a touch panel is applied to a cellular telephone, a possibility arises that the touch panel contacts the ear to cause a malfunction in making a call, for example. Patent Document 1 describes that such malfunctions are prevented using an acceleration sensor.

CITATION LIST

Patent Documents

Patent Document 1: JP 2011-61316 A

SUMMARY OF THE INVENTION

Problems to be Solved by the Invention

Patent Document 1 describes the use of an acceleration sensor for preventing malfunctions. However, the acceleration sensor is a necessary configuration, there is no disclosure for preventing malfunctions on a device including no acceleration sensor, and it is not enabled to prevent malfunctions on such a device.

Moreover, in the case where a device including a touch panel is a device foldably configured, it is likely that the touch panel is brought close to buttons, for example, provided at positions corresponding to the touch panel when the device is folded or in the folded state. In this case, it is likely to cause malfunctions.

There is a device mounted with a lid switch in order to prevent such malfunctions. Since it takes time until the lid switch detects a closing motion and sends the detection to software to control the lid switch for operating control that prevents faulty reaction, it is likely to cause a malfunction. Since the detection by the lid switch operates independently of the touch panel, the touch panel sometimes reacts faster than the detection by the lid switch. In this case, when the device is closed faster, the touch panel reacts faster than the lid switch to cause a malfunction.

Moreover, similarly in opening the device, the touch panel sometimes reacts faster than the lid switch. At this time, it is likely to cause a malfunction with no reaction, even though the touch panel is contacted in the opened state. It is desired to provide a scheme for preventing such a malfunction on the touch panel.

The present technique is made in consideration of the situations, and is to prevent a malfunction on a touch panel.

Solutions to Problems

An information processing apparatus according to an aspect of the present technique is an information processing apparatus including at least two surfaces, in which a relative position between one surface and the other surface of the two surfaces is changed, the information processing apparatus including: a detecting unit configured to detect that a relative position between the two surfaces is changed, from a change in electrostatic capacitance values of a plurality of electrostatic capacitance sensors included in a predetermined region of at least one surface of the two surfaces.

The detecting unit may detect that a relative position between the two surfaces is changed by determining whether the change is a change in which electrostatic capacitance values of the electrostatic capacitance sensors tend to increase or a change in which values from the sensors tend to reduce.

A relative position between the two surfaces being changed may be detected by calculating a differential value between a first electrostatic capacitance value acquired at a predetermined timing and a second electrostatic capacitance value acquired at a subsequent timing individually for the electrostatic capacitance sensors, further calculating a sum total of the calculated differential values, and determining whether a value of the sum total tends to increase or tends to reduce.

The detecting unit may detect that a relative position between the two surfaces is changed by determining whether a number of the electrostatic capacitance sensors whose electrostatic capacitance value is increased is increasing or a number of the electrostatic capacitance sensors whose electrostatic capacitance value is reduced is increasing.

The detecting unit may detect that a relative position between the two surfaces is changed by calculating a differential value between a first electrostatic capacitance value acquired at a predetermined timing and a second electrostatic capacitance value acquired at a subsequent timing individually for the electrostatic capacitance sensors, further calculating a difference between a maximum differential value and a minimum differential value, and determining whether the difference is in a predetermined range.

The detecting unit may detect that a relative position between the two surfaces is changed by calculating a differential value between a first electrostatic capacitance value acquired at a predetermined timing and a second electrostatic capacitance value acquired at a subsequent timing individually for the electrostatic capacitance sensors and determining whether a number of the sensors whose differential value is increased or reduced is a predetermined value or more.

A surface including the predetermined region of the two surfaces may be configured of a touch panel.

It may be possible that when an event is notified from the touch panel to an operating system in detecting a change in a relative position between the two surfaces by the detecting unit, the event from the touch panel to the operating system is stopped, and when an event is not notified from the touch panel to the operating system, the event is notified from the touch panel to the operating system.

It may be possible that when an event from the touch panel is notified from an operating system to an application in detecting a change in a relative position between the two surfaces by the detecting unit, the event from the operating system to the application is stopped, and when an event from the touch panel is not notified from the operating system to the application, the event is notified from the operating system to the application.

It may be possible that the two surfaces are individually configured of a touch panel; at least one touch panel includes the predetermined region; when the detecting unit of the touch panel including the predetermined region detects a change in a relative position between the two surfaces, the other touch panel is notified of the detection; when the two touch panels individually notify an event to an operating system, the event to the operating system is stopped; and when the two touch panels do not notify an event to the operating system, the event is notified to the operating system.

It may be possible that the two surfaces are individually configured of a touch panel; the two touch panels individually include the predetermined region; when the detecting unit of one of the touch panels detects a change in a relative position between the two surfaces, the other touch panel is notified of the detection; when the two touch panels individually notify an event to an operating system, the event to the operating system is stopped; and when the two touch panels do not notify an event to the operating system, the event is notified to the operating system.

It may be possible that the two surfaces are individually configured of a touch panel; at least one touch panel includes the predetermined region; when the detecting unit of the touch panel including the predetermined region detects a change in a relative position between the two surfaces, an operating system is notified of the detection; when the operating system notifies an event to an application, the event to the application is stopped; and when the operating system does not notify an event to the application, the event is notified to the application.

It may be possible that the two surfaces are individually configured of a touch panel; the two touch panels individually include the predetermined region; when the detecting unit of one of the two touch panels detects a change in a relative position between the two surfaces is detected, an operating system is notified of the detection; when the operating system notifies an event to an application, the event to the application is stopped; and when the operating system does not notify an event to the application, the event is notified to the application.

An information processing method according to an aspect of the present technique is an information processing method for an information processing apparatus including at least two surfaces, in which a relative position between one surface and the other surface of the two surfaces is changed, the information processing method including the step of: detecting that a relative position between the two surfaces is changed, from a change in electrostatic capacitance values of a plurality of electrostatic capacitance sensors included in a predetermined region of at least one surface of the two surfaces.

A program according to an aspect of the present technique is a computer readable program causing a computer that controls an information processing apparatus including at least two surfaces, in which a relative position between one surface and the other surface of the two surfaces is changed, to perform a process including the step of: detecting that a relative position between the two surfaces is changed, from a change in electrostatic capacitance values of a plurality of electrostatic capacitance sensors included in a predetermined region of at least one surface of the two surfaces.

A recording medium according to an aspect of the present technique is a recording medium on which a computer readable program is recorded, the program causing a computer that controls an information processing apparatus including at least two surfaces, in which a relative position between one surface and the other surface of the two surfaces is changed, to perform a process including the step of: detecting that a relative position between the two surfaces is changed, from a change in electrostatic capacitance values of a plurality of electrostatic capacitance sensors included in a predetermined region of at least one surface of the two surfaces.

In the information processing apparatus, the information processing method, the program, and the recording medium according to an aspect of the present technique, the information processing apparatus includes at least two surfaces, in which the relative position between one surface and the other surface of the two surfaces is changed, and a relative position between the two surfaces being changed is detected from a change in electrostatic capacitance values of a plurality of electrostatic capacitance sensors included in a predetermined region of at least one surface of the two surfaces of the information processing apparatus.

EFFECTS OF THE INVENTION

According to an aspect of the present technique, it is possible to prevent a malfunction on a touch panel.

BRIEF DESCRIPTION OF DRAWINGS

FIG. 8 is a diagram illustrating sensor values.

FIG. 11 is a diagram illustrating sensor values according to angles.

FIG. 12 is a diagram illustrating differential values according to angles.

MODES FOR CARRYING OUT THE INVENTION

In the following, an embodiment of the present technique will be described with reference to the drawings.

[The Appearance Configuration]

Since the present technique can be applied to a device including a plurality of touch panels, two touch panels, for example, an example of a device including two touch panels is taken and described in the following description. Although the detail will be described later, a touch panel is in a structure in which the touch panel can detect a portion touched by a user. In other words, the touch panel is in a structure in which the touch panel can acquire the coordinates of a position touched by a user.

Moreover, for the purpose of confirming buttons, for example, to be manipulated by a user, such a configuration is provided in which a display such as an LCD (Liquid Crystal Display) is provided below a translucent member in the lower part of the touch panel.

Figure 1:
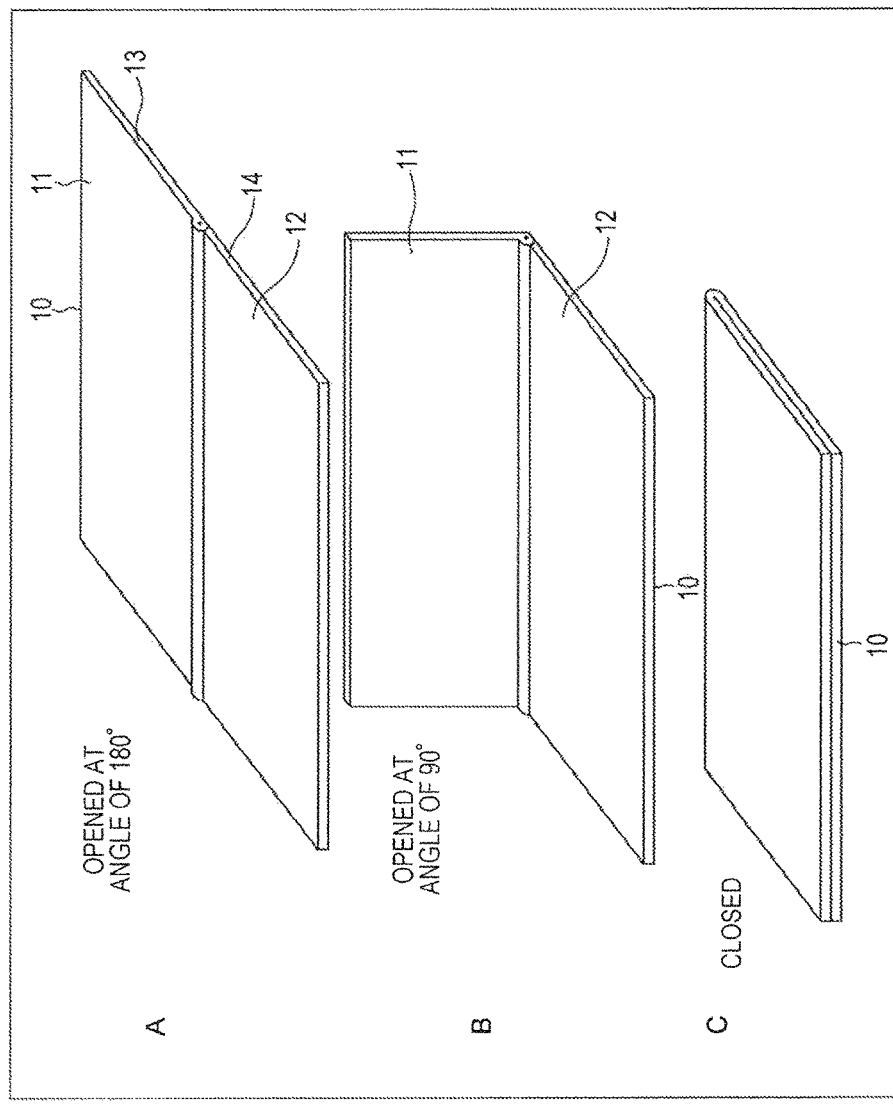
FIG. 1 is a diagram illustrating the opening and closing motions of an information processing apparatus.

As illustrated in A in FIG. 1, an information processing apparatus 10 includes two touch panels. Moreover, the information processing apparatus 10 is openably configured. A in FIG. 1 is a state in which the information processing apparatus 10 is opened at an angle of 180 degrees. As illustrated in A in FIG. 1, a touch panel positioned generally on the upper side when seen from the user side in the opened state is described as an upper touch panel 11, and a touch panel positioned generally on the lower side is described as a lower touch panel 12. A display 13 is provided on the lower part of the upper touch panel 11, and a display 14 is provided on the lower part of the lower touch panel 12.

Since the information processing apparatus 10 is openably configured, the relative position between the upper touch panel 11 and the lower touch panel 12 is configured in which the position relationship desired by the user can be kept in a range of an angle of zero degree to an angle of 180 degrees as in the opened state at an angle of 180 degrees as illustrated in A in FIG. 1, in the opened state at an angle of 90 degrees as illustrated in B in FIG. 1, and in the closed state (in the opened state at an angle of zero degree) as illustrated in C in FIG. 1. The closed state is mainly the state in which the information processing apparatus 10 is carried, and the opened state from an angle of 90 degrees to an angle of 180 degrees is mainly the state in which the information processing apparatus 10 is used.

The information processing apparatus 10 can be applied to a device including a personal computer, a cellular telephone, and a game machine, for example. Moreover, although not illustrated in the drawing, the information processing apparatus 10 also includes a physical operating switch, for example.

Figure 2:
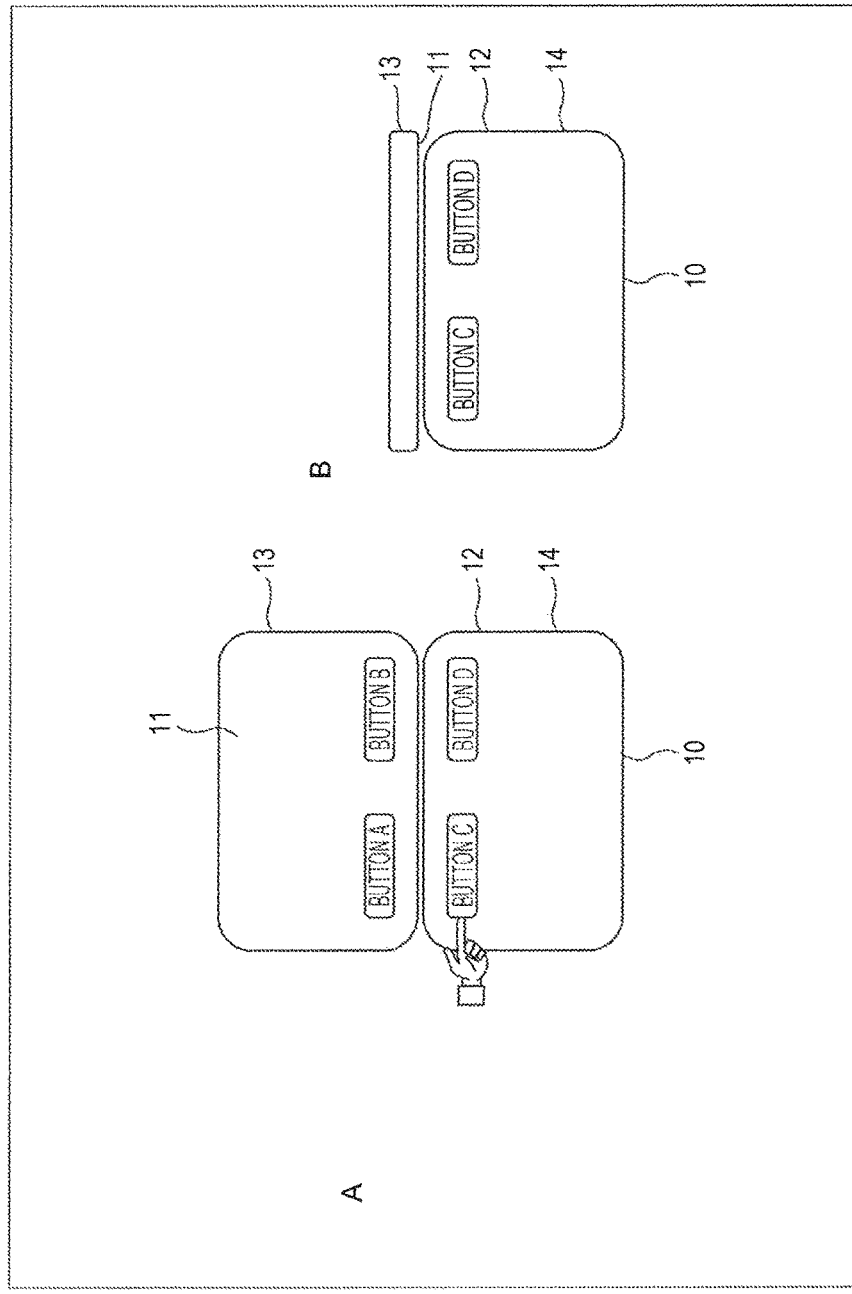
FIG. 2 is a diagram illustrating a faulty reaction.

FIG. 2 is a state in which buttons A to D to be manipulated are displayed on the display 13 and the display 14. As illustrated in A in FIG. 2, the button A and the button B are displayed on the lower side of the display 13 in the drawing, and the button C and the button D are displayed on the upper side of the display 14 in the drawing. The button A and the button B are configured in which the button A and the button B can be manipulated when the user's finger touches positions at which the buttons are displayed on the upper touch panel 11. Moreover, the button C and the button D are configured in which the button C and the button D can be manipulated when the user's finger touches positions at which the buttons are displayed on the lower touch panel 12.

Figure 3:
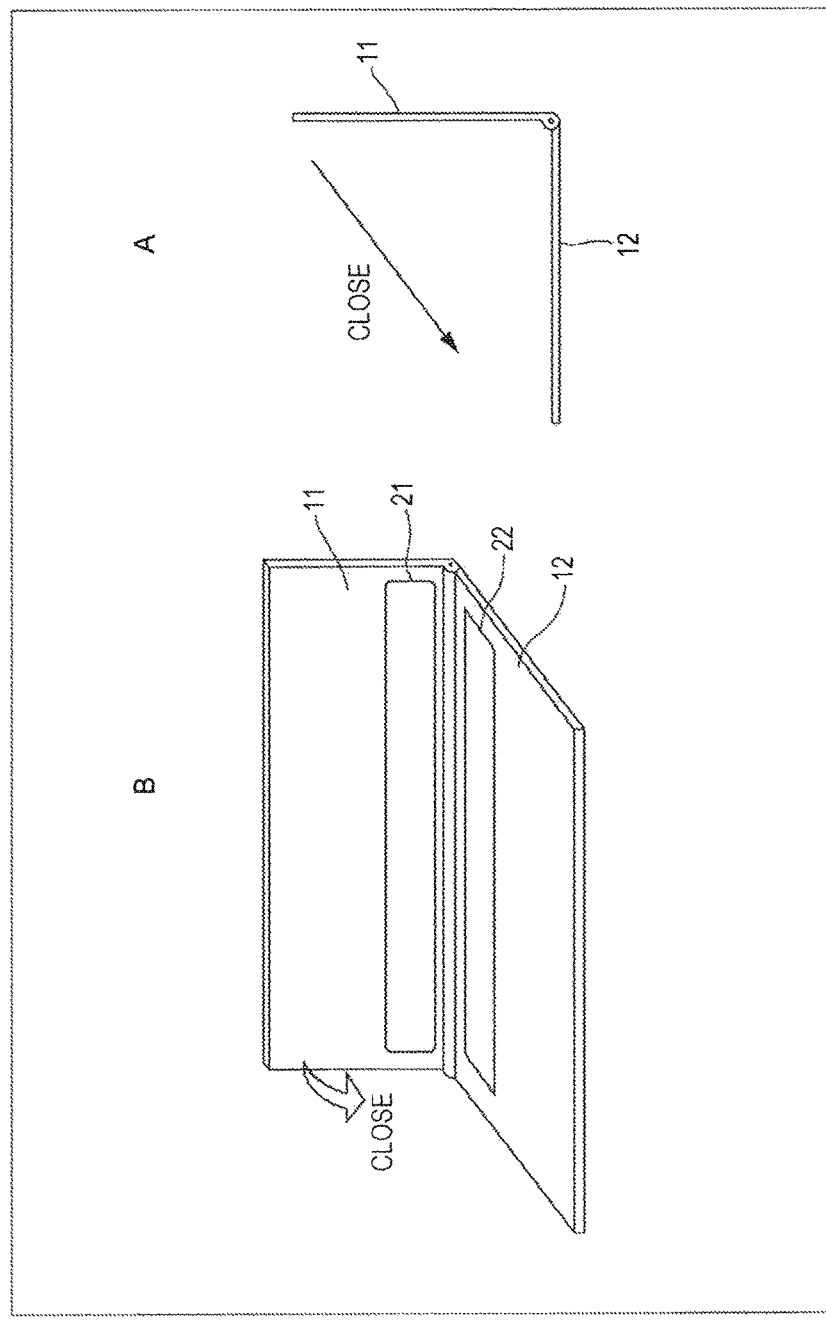
FIG. 3 is a diagram illustrating the situations where a faulty reaction occurs.

The case is considered where the information processing apparatus 10 is closed when these buttons are displayed on the display 13 or the display 14, as illustrated in B in FIG. 2. A in FIG. 3 schematically illustrates the information processing apparatus 10 seen in the lateral direction. As similar to the state illustrated in B in FIG. 2, A in FIG. 3 is the opened state at an angle of 90 degrees in which the upper touch panel 11 is closed in the direction of an arrow in the drawing, that is, in the direction of the lower touch panel 12 from this state.

As similar to the state illustrated B in FIG. 1, B in FIG. 3 is the information processing apparatus 10 seen from the front in the opened state at an angle of 90 degrees. A region on the lower side of the upper touch panel 11 in the drawing, which corresponds to positions at which the button A and the button B are displayed as illustrated A in FIG. 2, is a region 21. Similarly, a region on the lower side of the lower touch panel 12 in the drawing, which corresponds to positions at which the button C and the button D are displayed as illustrated in B in FIG. 2, is a region 22.

The region 21 and the region 22 are regions which are likely to gradually come into reaction with each other when the information processing apparatus 10 is changed from the opened state at an angle of 90 degrees to the closed state, for example. When the upper touch panel 11 is gradually brought close in the direction of the lower touch panel 12, it is likely that the upper touch panel 11 gradually comes into contact with the lower touch panel 12 from a portion near the portion at which the upper touch panel 11 contacts the lower touch panel 12, that is, from a portion near the region 21 and the region 22. It is likely to detect that the user's finger touches the region 21 or the user's finger touches the region 22 because the upper touch panel 11 contacts the lower touch panel 12.

Supposing that it is detected that the user's finger touches the region 21 when the information processing apparatus 10 is closed, it is likely that an operation system or an application (not shown) processes the touch because the button A or the button B is manipulated. It is necessary to prevent such a malfunction.

Therefore, in the embodiment, the region 21 and the region 22 are allowed to determine whether the reaction is caused by a closing motion, a process according to the determined result is performed, and control can be performed so as not to cause malfunctions. It is noted that in the following description, the closing motion will be mainly described. However, control can be performed so as not to cause malfunctions using the reaction of the region 21 and the region 22 also in an opening motion.

[An Exemplary Internal Configuration of the Information Processing Apparatus]

Figure 4:
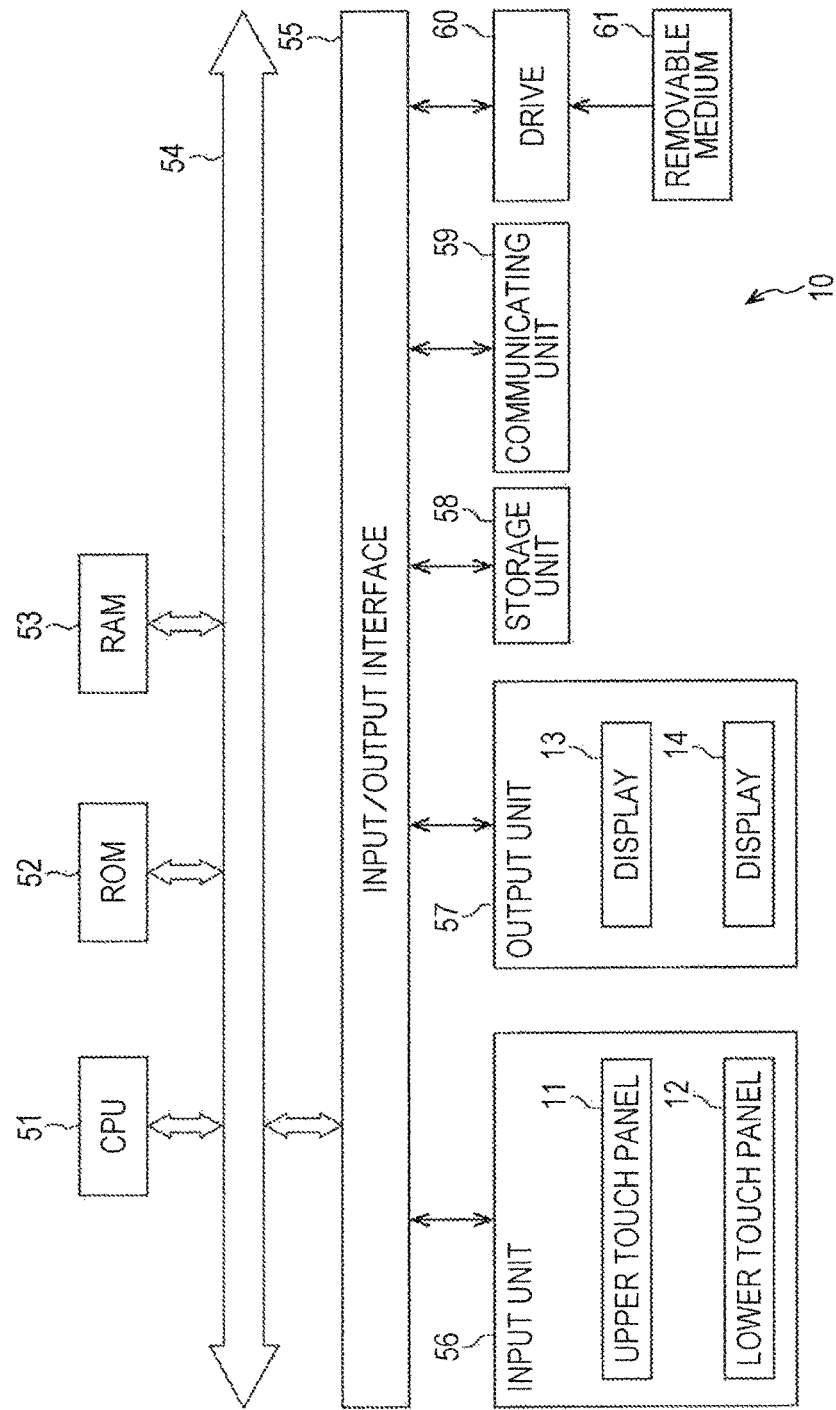
FIG. 4 is a diagram of the configuration of an embodiment of an information processing apparatus to which the present technique is applied.

First, an exemplary internal configuration of the information processing apparatus 10 will be described, to which the present technique is applied, with reference to FIG. 4. In the information processing apparatus 10, a CPU (Central Processing Unit) 51, a ROM (Read Only Memory) 52, and a RAM (Random Access Memory) 53 are connected to each other through a bus 54. An input/output interface 55 is further connected to the bus 54. An input unit 56, an output unit 57, a storage unit 58, a communicating unit 59, and a drive 60 are connected to the input/output interface 55.

The input unit 56 includes the upper touch panels 11 and 12, and is configured of a keyboard, a mouse, and a microphone, for example. The output unit 57 includes the displays 13 and 14, and is configured of a speaker, for example. The storage unit 58 is formed with a hard disk, a nonvolatile memory, or the like.

It is noted that the upper touch panels 11 and 12 in the present specification are integrally formed with the displays 13 and 14 such as LCDs (Liquid Crystal Displays), and are configured in which buttons, for example, displayed on the displays 13 and 14 can be manipulated by touching the upper touch panels 11 and 12 as described above. Namely, the upper touch panels 11 and 12 are configured to detect contact information such as positional information on a screen touched by the user's finger or a pen, for example, and the displays 13 and 14 are configured to display predetermined image information, for example.

The communicating unit 59 is formed with a network interface or the like. The drive 60 drives a removable medium 61 such as a magnetic disk, an optical disk, a magneto-optical disk, and a semiconductor memory.

In the information processing apparatus 10 thus configured, the CPU 51 loads a program, for example, stored on the storage unit 58 to the RAM 53 through the input/output interface 55 and the bus 54 and runs the program for performing various processes. The program run by the CPU 51 is recorded on the removable medium 61 as a package medium, for example, and provided.

It is noted that for the package medium, a magnetic disk (including a flexible disk), an optical disk (a CD-ROM (Compact Disc-Read Only Memory) and a DVD (Digital Versatile Disc), for example), a magneto-optical disk, or a semiconductor memory, for example, is used. Alternatively, the programs can be provided via a wired or wireless transmission medium such as a local area network, the Internet, or digital satellite broadcasting.

In the information processing apparatus 10, the program can be installed on the storage unit 58 through the input/output interface 55 by mounting the removable medium 61 on the drive 60. Moreover, the program can be received at the communicating unit 59 through a cable or wireless transmission medium, and installed on the storage unit 58. In addition to this, the program can be preinstalled on the ROM 52 or the storage unit 53.

It is noted that the program run by the information processing apparatus 10 may be processes processed in a time series along an order described in the present specification, or may be a program processed in parallel or at a necessary timing when called, for example.

Figure 5:
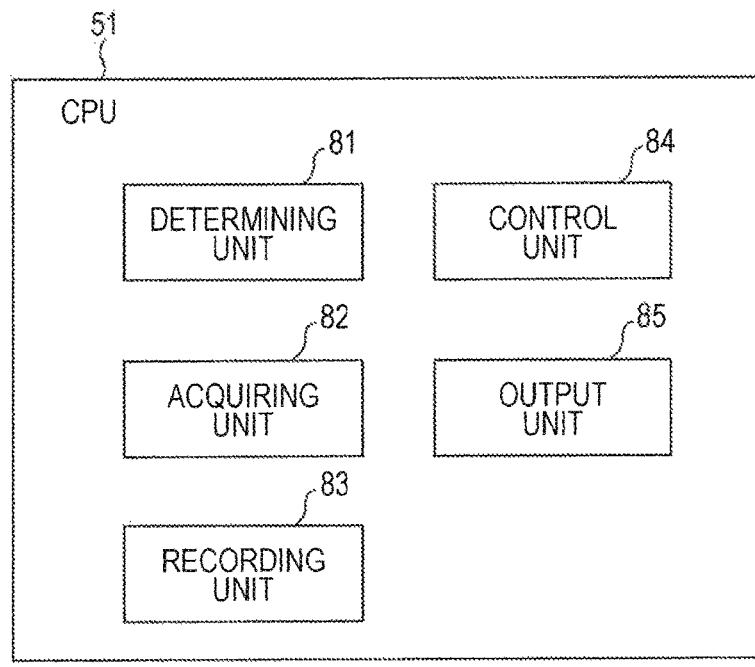
FIG. 5 is a diagram of the functions of the information processing apparatus.

FIG. 5 is a block diagram of an exemplary functional configuration of the CPU 51. The CPU 51 includes functional blocks, a determining unit 81, an acquiring unit 82, a recording unit 83, a control unit 84, and an output unit 85. It is noted that the blocks of the CPU 51 can send and receive signals and data with each other, as necessary.

The determining unit 81 determines various items of information. For example, the determining unit 81 determines whether the upper touch panel 11 is in the state in which the upper touch panel 11 is moved in the direction of the lower touch panel 12 (in the closed state). The acquiring unit 82 acquires various items of information. For example, the acquiring unit 82 acquires contact information from the upper touch panel 11. The recording unit 83 records various items of information. For example, the recording unit 83 holds the values of sensors provided on the upper touch panel 11 and values calculated from the values. The control unit 84 preforms various control processes. The output unit 85 outputs various items of information.

Figure 6:
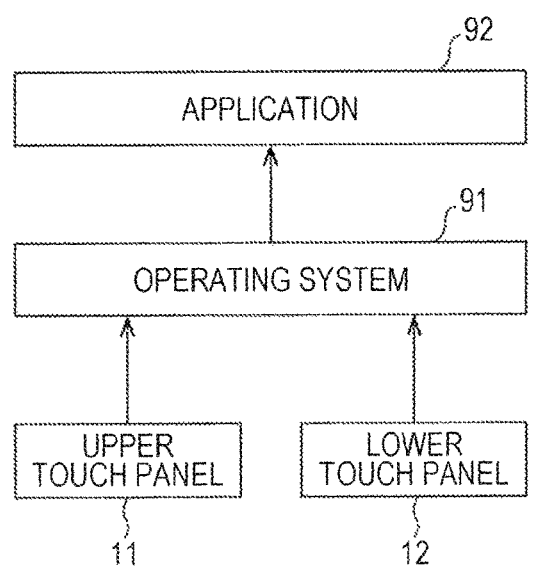
FIG. 6 is a diagram illustrating the software configuration of the information processing apparatus.

FIG. 6 is a diagram of the outline of the processes of software related to control in the information processing apparatus 10. The software is configured of an operating system 91 and an application 92, and controlled by the control unit 84.

The upper touch panel 11 and the lower touch panel 12 output the detected contact information to the operating system 91. For example, the contact information is information including positional information for individual contact points touched by the user and information that identifies the order of touches (time information or ID (Identification)).

For example, when the user's finger touches the upper touch panel 11, the coordinates of the touched position is detected. The coordinate value of the detected coordinates is notified to the operating system 91 in the OS layer. For example, the operating system 91 is configured to include a touch panel driver. In this case, the operating system 91 sends the coordinate value supplied from the upper touch panel 11 to the application 92.

The application 92 determines a button, for example, which is located at the coordinate value, from the coordinate value supplied through the operating system 91. For example, when the button determined as manipulated is a button manipulated in closing the application, a process according to the determined result, that is, a process for closing the application is executed.

Next, the sensors on the upper touch panel 11 and the lower touch panel 12 will be described. Here, the description is continued as the upper touch panel 11 and the lower touch panel 12 are in the same size and include the same number of the sensors. However, the present technique is applicable to even a plurality of touch panels in different sizes including different numbers of sensors. Moreover, in the following description, the upper touch panel 11 is taken and described as an example, and the description of the lower touch panel 12 is appropriately omitted.

Figure 7:
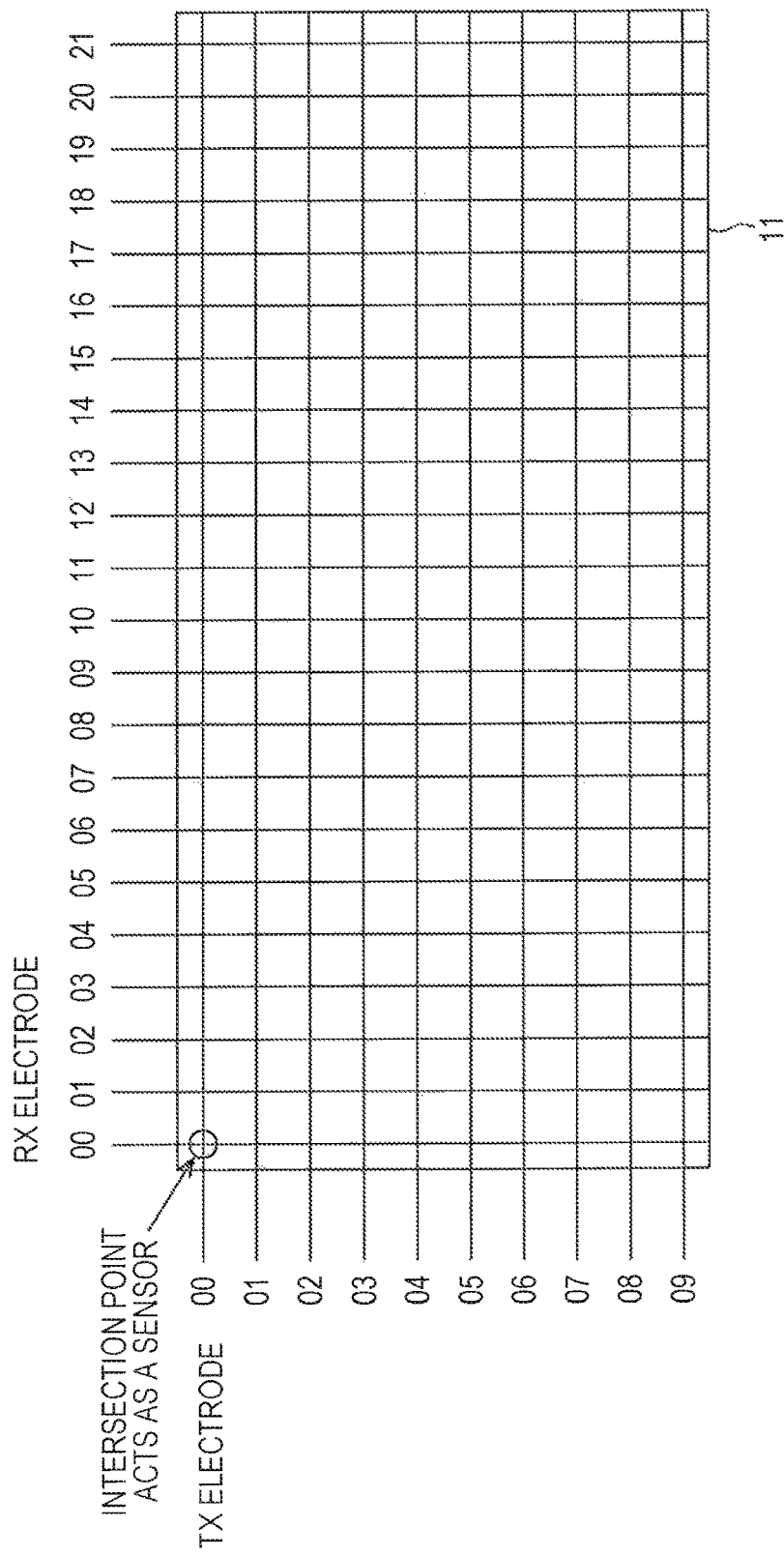
FIG. 7 is a diagram illustrating the disposition of sensors.

FIG. 7 is a diagram illustrating the sensors on the upper touch panel 11. As illustrated in FIG. 7, on the upper touch panel 11, TX electrodes and RX electrodes are regularly arranged in a grid. In the example illustrated in FIG. 7, ten electrodes of TX electrodes 00 to 09 are arranged, and 22 electrodes of RX electrodes 00 to 21 are arranged. The intersection point of the TX electrode and the RX electrode acts as a sensor. A change in the electrostatic capacitance of the sensor is measured at the individual intersection points.

In the following description, the electrode of the TX electrode "00" is described as the TX electrode 00, and the electrode of the RX electrode "00" is described as the RX electrode 00. Moreover, the intersection point of the TX electrode 00 and the RX electrode 00 is described as an intersection point 0000 or a sensor 0000 (in 0000, the former 00 expresses a TX electrode number, and the latter 00 expresses a RX electrode number).

The electrostatic capacitance of the sensor is measured at every predetermined period. When the sensor is pressed as by being touched with the user's finger, for example, the electrostatic capacitance is changed. The position of the changed sensor is detected as a manipulated position. For example, in the case the intersection point 0000 is touched by the finger, the electrostatic capacitance of the intersection point 0000 is changed. The change is then detected, and it is detected that the finger touches the intersection point 0000.

Figure 8:
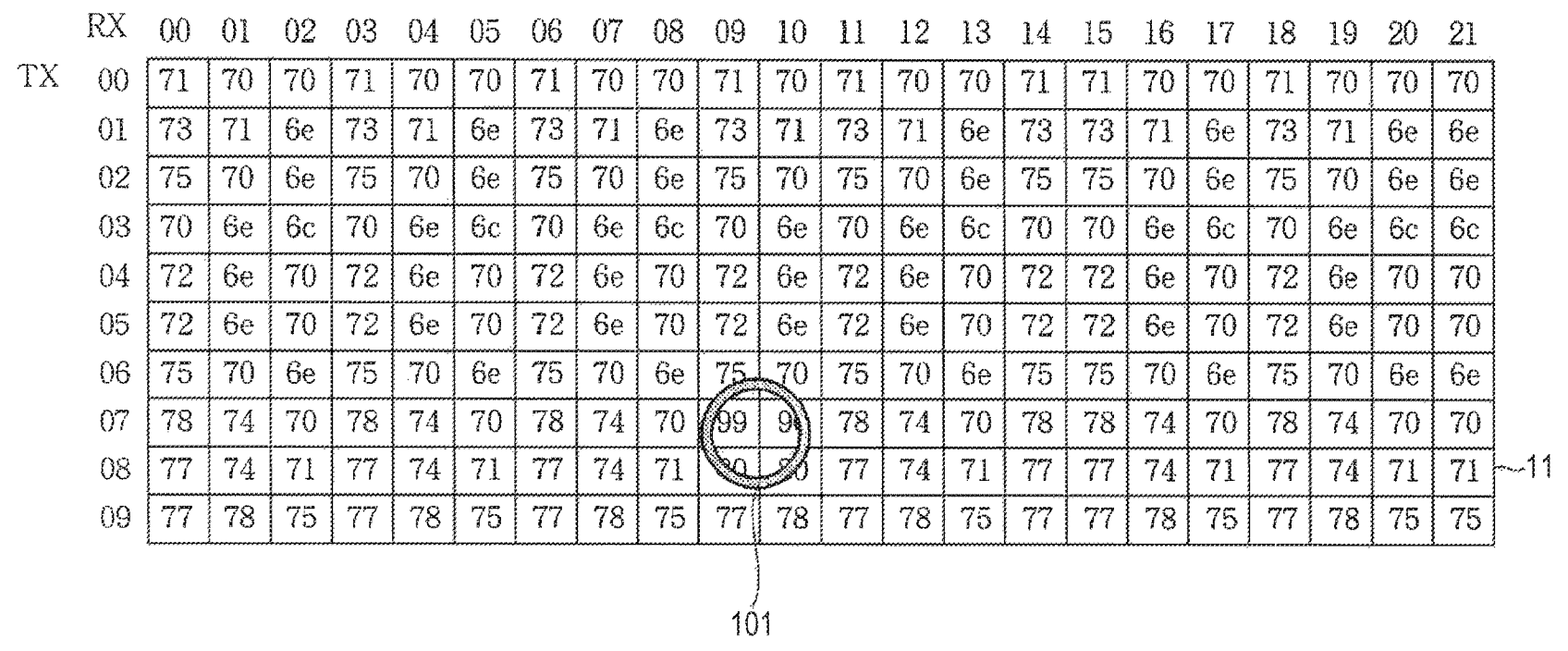

The detection of the contact position on the upper touch panel 11 will be further described with reference to FIG. 8. FIG. 8 is a diagram in which an evaluation value found from the electrostatic capacitance is calculated for the individual intersection points and the evaluation values are shown at the individual intersection points. The RX electrode numbers on the upper side and the TX electrode numbers on the left side are expressed by decimal numeric values as similar to the diagram in FIG. 7, and the evaluation values at the Intersection points are expressed by hexadecimal numeric values. For example, it is shown from FIG. 8 that the evaluation value at the intersection point 0000 of the TX electrode 00 and the RX electrode 00 is 71 (a hexadecimal number).

In FIG. 8, a contact place 101 is a place touched by the user's finger. The contact place 101 extends over four intersection points. These four intersection points are an intersection point 0709 of the TX electrode 07 and the RX electrode 09, an intersection point 0710 of the TX electrode 07 and the RX electrode 10, an intersection point 0809 of the TX electrode 08 and the RX electrode 09, and the intersection point 0810 of the TX electrode 08 and the RX electrode 10.

The evaluation values at these four intersection points are the evaluation values of 90 (a hexadecimal number) or more, which are greater than the other evaluation values around 70 (a hexadecimal number). As described above, the evaluation value of the place touched by the finger takes a value higher than the other evaluation values. As described above, in the case where the position of the intersection point having an evaluation value higher than the other evaluation values is detected, it is detected that the finger touches the position.

It is noted that here, the description will be given supposing that it is detected that the position is the position touched by the finger when the evaluation value is increased. However, such a configuration may be possible in which it is detected that the position is the position touched by the finger when the evaluation value is reduced depending on a method for calculating evaluation values. Moreover, in the following description, the evaluation value is appropriately described as the sensor value.

Now, as described with reference to FIGS. 2 and 3, when the information processing apparatus 10 is closed, it is likely that the region 21 is brought close to the region 22 (illustrated in B in FIG. 3). When the region 21 is brought close to the region 22, the values of the sensors in the region 21 and the values of the sensors in the region 22 are changed. This will be again described with reference to FIG. 9.

Figure 9:
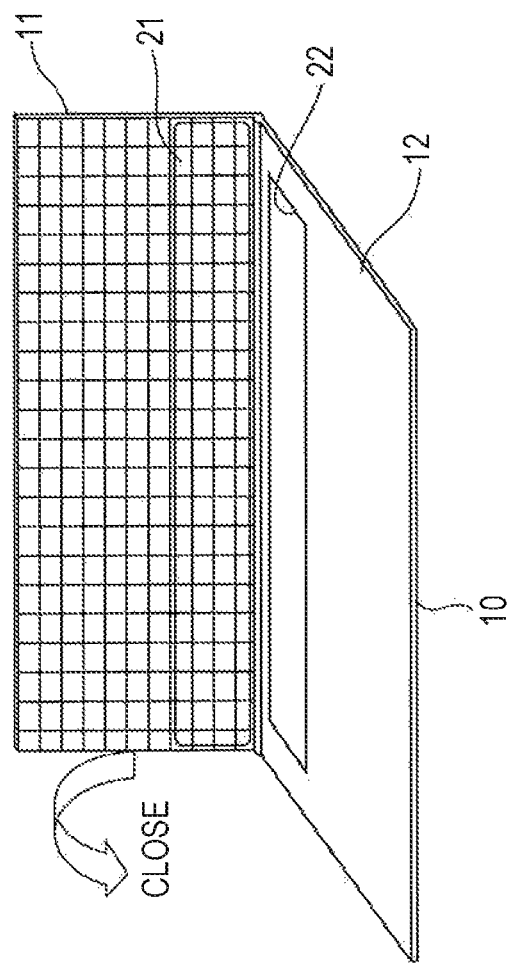
FIG. 9 is a diagram illustrating the relationship between sensors and regions.

Although an information processing apparatus 10 illustrated in FIG. 9 is the same as the information processing apparatus 10 illustrated in B in gig. 3, the TX electrodes and the RX electrodes illustrated in FIG. 7 are depicted on the upper touch panel 11 in the information processing apparatus 10 illustrated in FIG. 9. As illustrated in FIG. 9, a predetermined number of the TX electrodes located on the lower side of the upper touch panel 11 are included in the region 21. In the example illustrated in FIG. 9, the region 21 includes three electrodes, the TX electrodes 07 to 09, and includes the intersection points (the sensors) of the RX electrodes intersecting with these TX electrodes.

Although not illustrated in the drawing, as similar to the upper touch panel 11, the TX electrodes and the RX electrodes are disposed on the lower touch panel 12, and the region 22 on the upper side of the lower touch panel 12 includes a predetermined number of intersection points (sensors).

When the information processing apparatus 10 is closed, the sensors in the region 21 gradually come into contact with the region 22, and come into reaction. With the use of the reaction, it is determined whether it is a reaction caused by closing the apparatus. When it is determined that it is a reaction caused by closing the apparatus, a process suited to the state is performed.

Similarly, the sensors in the region 21 are gradually changed from the state of contacting the region 22 to the state apart from the region 22 when the information processing apparatus 10 is opened, and the reaction in association with the transition between the states can be detected. With the use of the reaction, it is determined whether it is a reaction caused by opening the apparatus. When it is determined that it is a reaction caused by opening the apparatus, a process suited to the state is performed.

Figure 10:
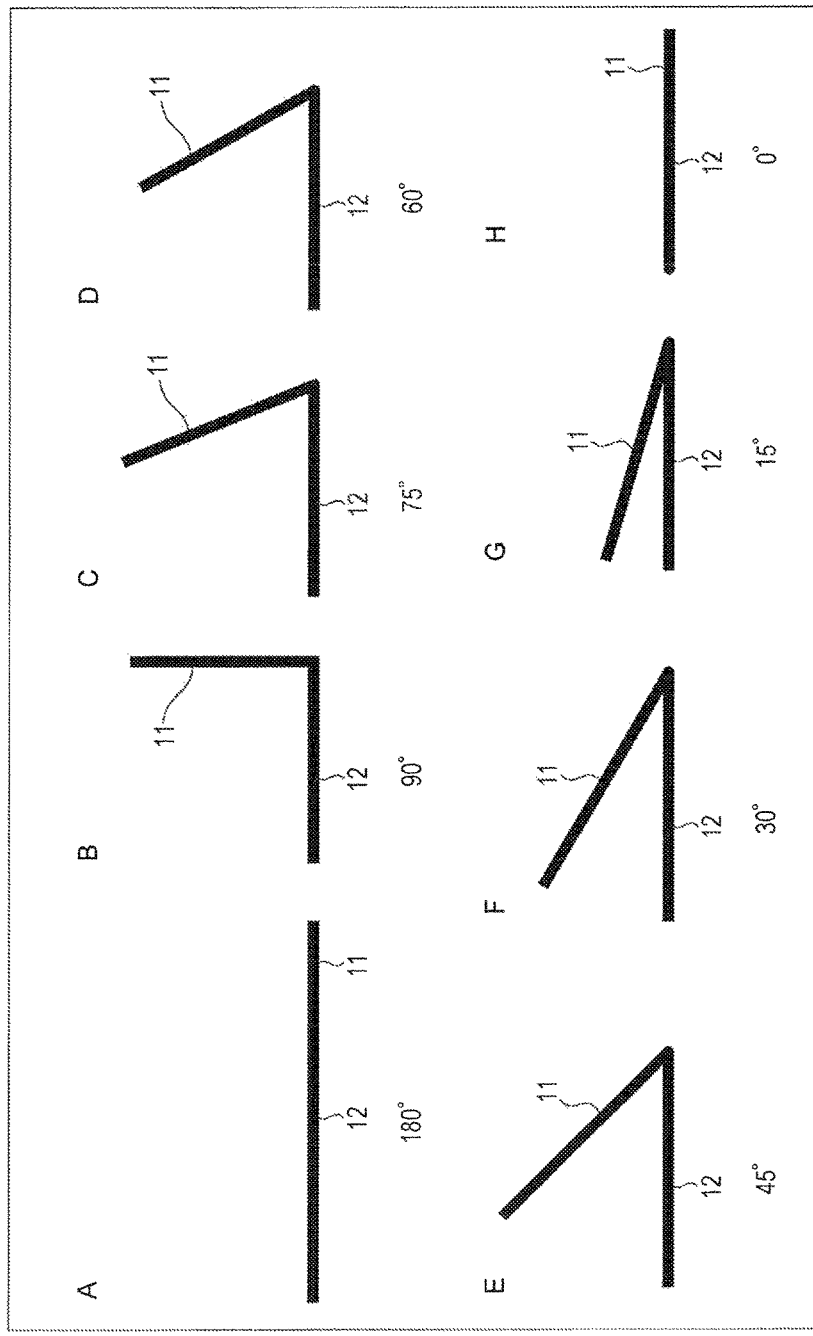
FIG. 10 is a diagram illustrating angles when performing a closing motion.

Next, how the sensors in the region 21 react will be described using specific numeric values. First, angles exemplifying sensor values will be described with reference to FIG. 10. A in FIG. 10 is the state in which the upper touch panel 11 and the lower touch panel 12 are at relative positions at an angle of 180 degrees. B in FIG. 10 is the state in which the upper touch panel 11 and the lower touch panel 12 are at relative positions at an angle of 90 degrees. C in FIG. 10 is the state in which the upper touch panel 11 and the lower touch panel 12 are at relative positions at an angle of 75 degrees.

D in FIG. 10 is the state in which the upper touch panel 11 and the lower touch panel 12 are at relative positions at an angle of 60 degrees. E in FIG. 10 is the state in which the upper touch panel 11 and the lower touch panel 12 are at relative positions at an angle of 45 degrees. F in FIG. 10 is the state in which the upper touch panel 11 and the lower touch panel 12 are at relative positions at an angle of 30 degrees. G in FIG. 10 is the state in which the upper touch panel 11 and the lower touch panel 12 are at relative positions at an angle of 15 degrees. H in FIG. 10 is the state (the closed state) in which the upper touch panel 11 and the lower touch panel 12 are at relative positions at an angle of zero degree.

The opened state at an angle of 180 degrees illustrated in A in FIG. 10 is the state in which the user generally manipulates the upper touch panel 11 and the lower touch panel 12. Moreover, the sensors in the region 21 and the region 22 are in the state in which the sensors do not react in association with the closing motion. For example, when the information processing apparatus 10 is closed from the opened state at an angle of 180 degrees, the state is gradually changed to the states at an angle of 90 degrees, an angle of 75 degrees, an angle of 60 degrees, an angle of 45 degrees, an angle of 30 degrees, an angle of 15 degrees, and to an angle of zero degree.

When the state is changed from an angle of 90 degrees to an angle of zero degree, the sensor values in the region 21 are changed according to the angles. FIG. 11 is examples of the changes. Here, the sensors positioned on the lowermost in the region 21, that is, the values of the sensors positioned on the TX electrode 09 are taken and described as an example. However, the other sensors in the region 21 may be used. It is noted that it is unnecessary that the information processing apparatus 10 itself includes a function of measuring an angle formed between the upper touch panel 11 and the lower touch panel 12. Here, measured angles are described for explanation.

Referring to FIG. 11, the sensor values at the intersection points of the TX electrode 09 and the RX electrodes 00 to 21 at an angle of 90 degrees are "61, 62, 77, 62, 69, 74, 5a, 68, 6b, 5a, 5d, 60, 5f, 6a, 60, 63, 67, 6a, 64, 6a, 6a, and 4f" in this order. These values illustrated in FIG. 11 are expressed by hexadecimal numbers.

When the state is changed from the state at an angle of 90 degrees to the state closed by an angle of 15 degrees, that is, the state is in the state at an angle of 75 degrees, the sensor values at the intersection points of the TX electrode 09 and the RX electrodes 00 to 21 are changed as "64, 62, 78, 63, 68, 75, 5b, 67, 6c, 5b, 5c, 60, 5d, 6a, 62, 64, 66, 6a, 65, 69, 6a, and 50" in this order.

When the state is changed from the state at an angle of 75 degrees to the state further closed by an angle of 15 degrees and the state is in the state at an angle of 60 degrees, the sensor values at the intersection points of the TX electrode 09 and the RX electrodes 00 to 21 are changed as "65, 62, 79, 64, 69, 75, 5c, 68, 6d, 5c, 5e, 62, 5f, 6c, 63, 66, 68, 6b, 66, 6a, 6c, and 51" in this order.

When the state is changed from the state at an angle of 60 degrees to the state further closed by an angle of 15 degrees and the state is in the state at an angle of 45 degrees, the sensor values at the intersection points of the TX electrode 09 and the RX electrodes 00 to 21 are changed as "65, 65, 7a, 66, 6a, 77, 5e, 6a, 6e, 5e, 5f, 65, 60, 6d, 64, 68, 6a, 6c, 68, 6d, 6c, and 52" in this order.

When the state is changed from the state at an angle of 45 degrees to the state further closed by an angle of 15 degrees and the state is in the state at an angle of 30 degrees, the sensor values at the intersection points of the TX electrode 09 and the RX electrodes 00 to 21 are changed as "67, 67, 7c, 69, 6c, 78, 61, 6c, 71, 61, 62, 69, 63, 70, 66, 6b, 6c, 6f, 6a, 6e, 6e, and 53" in this order.

When the state is changed from the state at an angle of 30 degrees to the state further closed by an angle of 15 degrees and the state is in the state at an angle of 15 degrees, the sensor values at the intersection points of the TX electrode 09 and the RX electrodes 00 to 21 are changed as "6b, 6a, 81, 6c, 71, 7d, 65, 71, 76, 65, 66, 6d, 69, 76, 6c, 6f, 71, 74, 6e, 73, 73, and 58" in this order.

When the state is changed from the state at an angle of 15 degrees to the state further closed by an angle of 15 degrees and the state is in the state (in the closed state) at an angle of zero degree, the sensor values at the intersection points of the TX electrode 09 and the RX electrodes 00 to 21 are changed as "79, 76, 90, 7c, 7f, 8d, 75, 80, 86, 75, 75, 7f, 7a, 87, 7c, 80, 7f, 84, 7e, 80, 82, and 68" in this order.

As described above, the sensor values are changed according to angles. FIG. 12 is the differential values of the sensor values between adjacent angles. The differential values illustrated in FIG. 12 are described in decimal numbers.

Referring to FIG. 12, the differential values when an angle formed between the upper touch panel 11 and the lower touch panel 12 is changed from an angle of 90 degrees to an angle of 75 degrees are as "03, 00, 01, 01, −1, 01, 01, −1, 01, 01, −1, 00, −2, 00, 02, 01, −1, 00, 01, −1, 00, and 01" in which the sensor value at an angle of 90 degrees is subtracted from the sensor value at an angle of 75 degrees and the sensor values are described in order of the RX electrodes 00 to 21. In this case, the number of the sensors whose value is increased is eleven, the number of the sensors whose value is not changed is five, and the number of the sensors whose value is reduced is six. Moreover, the total value of the differential values is seven.

The differential values when an angle formed between the upper touch panel 11 and the lower touch panel 12 is changed from an angle of 75 degrees to an angle of 60 degrees are as "01, 00, 01, 01, 01, 00, 01, 01, 01, 01, 02, 02, 02, 02, 01, 02, 02, 01, 01, 01, 02, and 01" in which the sensor value at an angle of 75 degrees is subtracted from the sensor value at an angle of 60 degrees and the sensor values are described in order of the RX electrodes 00 to 21. In this case, the number of the sensors whose value is increased is 20, the number of the sensors whose value is not changed is two, and the number of the sensors whose value is reduced is zero. Moreover, the total value of the differential values is 27.

The differential values when an angle formed between the upper touch panel 11 and the lower touch panel 12 is changed from an angle of 60 degrees to an angle of 45 degrees are as "00 03, 01, 02, 01, 02, 02, 02, 02, 02, 01, 03, 01, 01, 01, 02, 02, 01, 02, 01, 00, and 01" in which the sensor value at an angle of 60 degrees is subtracted from the sensor value at an angle of 45 degrees and the sensor values are described in order of the RX electrodes 00 to 21. In this case, the number of the sensors whose value is increased is 20, the number of the sensors whose value is not changed is two, and the number of the sensors whose value is reduced is zero. Moreover, the total value of the differential values is 34.

The differential values when an angle formed between the upper touch panel 11 and the lower touch panel 12 is changed from an angle of 45 degrees to an angle of 30 degrees are as "02, 02, 02, 03, 02, 01, 03, 02, 03, 03, 03, 04, 03, 03, 02, 03, 02, 03, 02, 01, 02, and 00" in which the sensor value at an angle of 45 degrees is subtracted from the sensor value at an angle of 30 degrees and the sensor values are described in order of the RX electrodes 00 to 21. In this case, the number of the sensors whose value is increased is 21, the number of the sensors whose value is not changed is one, and the number of the sensors whose value is reduced is zero. Moreover, the total value of the differential values is 52.

The differential values when an angle formed between the upper touch panel 11 and the lower touch panel 12 is changed from an angle of 30 degrees to an angle of 15 degrees are as "04, 03, 05, 03, 05, 05, 04, 05, 05, 04, 04, 04, 06, 06, 06, 04, 05, 05, 04, 05, 05, and 05" in which the sensor value at an angle of 30 degrees is subtracted from the sensor value at an angle of 15 degrees and the sensor values are described in order of the RX electrodes 00 to 21. In this case, the number of the sensors whose value is increased is 22, and the number of the sensors whose value is not changed and the number of the sensors whose value is reduced are zero. Moreover, the total value of the differential values is 102.

The differential values when an angle formed between the upper touch panel 11 and the lower touch panel 12 is changed from an angle of 15 degrees to an angle of zero degree are as "14, 12, 15, 16, 14, 16, 16, 15, 16, 16, 15, 18, 17, 17, 16, 17, 14, 16, 16, 13, 15, and 16" in which the sensor value at an angle of 15 degrees is subtracted from the sensor value at an angle of zero degree and the sensor values are described in order of the RX electrodes 00 to 21. In this case, the number of the sensors whose value is increased is 22, and the number of the sensors whose value is not changed and the number of the sensors whose value is reduced are zero. Moreover, the total value of the differential values is 340.

As described above, the sensor values tend to gradually increase when an angle formed between the upper touch panel 11 and the lower touch panel 12 is gradually reduced. First, the number of the sensors whose value is increased is changed from 11 to 20, 20, 21, 22, and to 22. As described above, when an angle formed between the upper touch panel 11 and the lower touch panel 12 is gradually reduced, the number of the sensors whose value is increased is increasing. The sum total of the differential values is then changed from 7 to 27, 34, 52, 102, and to 340. As described above, when an angle formed between the upper touch panel 11 and the lower touch panel 12 is gradually reduced, the sum total value of the differential values of the sensor values is increased.

As described above, it can be detected that the angle is changed to the state in which an angle formed between the upper touch panel 11 and the lower touch panel 12 is reduced, that is, it can be detected that the apparatus is moving in the closing direction using the fact that the sensor value is increased.

As described above, the sensor value is increased when the apparatus is closed, whereas the sensor value is reduced when opened. Thus, it can be detected that an angle formed between the upper touch panel 11 and the lower touch panel 12 is changed to the state in which the angle is increased, that is, it can be detected that the apparatus is moving in the opening direction using the fact that the sensor value is reduced.

However, as described below, since it is necessary to distinguish the increase from an increase in the case where the sensor value is increased because the finger touches the panel, it is not enabled to simply make a determination that the upper touch panel 11 is moving in the closing direction because the sensor value is increased and that the upper touch panel 11 is moving in the opening direction because the sensor value is reduced.

Here, the sensor values at predetermined angles are exemplified. When the information processing apparatus 10 does not include the function of detecting angles, it is not enabled that sensor values are acquired at a predetermined angle and differential values are calculated. However, since the touch panels acquire sensor values at predetermined intervals, the differential values of the sensor values acquired at these predetermined intervals can be calculated. Thus, for convenience of explanation here, the description is continued as detection is performed using a predetermined angle and sensor values obtained at this predetermined angle. However, such a configuration may of course be possible in which detection is performed using sensor values obtained at predetermined intervals.

It is noted that here, the description will be given supposing that the sensor value is increased when the apparatus is closed and the sensor value is reduced when the apparatus is opened. However, in some cases, the sensor value is reduced when the apparatus is closed and the sensor value is increased when the apparatus is opened depending on how the firmware of touch panels is formed. It is without saying that the present technique can be applied to even such a form.

Next, conditions when it is determined that the upper touch panel 11 is closed or opened, in other words, conditions for detecting the motion of opening or closing of the upper touch panel 11 has been performed will be described. First, the conditions when it is determined that the touch penal is closed will be described. For the conditions, there are four conditions below.

Condition 1 in which the number of the sensors increasing the differential value from the previously detected value becomes more in the individual sensors.

Condition 2 in which the sum total of the differential values is continuously increased.

Condition 3 in which the differential value from the previously detected value is not varied in the individual sensors.

Condition 4 in which the sensors increasing the differential value from the previously detected value is at a certain rate in the individual sensors.

As described above, Condition 1 is the case where the number of the sensors whose value is increased is changed from 11 to 20, 20, 21, 22, and to 22, for example. The fact that the number of the sensors of which differential value increasing becomes more, allows determining that the state is the state in which the other surface is brought close to the line.

As described above, Condition 2 is the case where the sum total of the differential values is changed from 7 to 27, 34, 52, 102, and to 340, for example. The fact that the sum total of the differential values increasing allows determining that the state is the state in which force is gradually applied is increasing.

Condition 1 and Condition 2 are the conditions for detecting opening and closing motions by determining whether the value from the sensor is changed for an increase or changed for a reduction.

Moreover, in Condition 1, a determination whether the value from the sensor shows a change of an increase trend or of a reduction trend means to determine by studying the number of sensors of which value is increasing becomes more for a change of an increase trend, and by studying the number of sensors of which value is reducing becomes more for the change of a reduction trend.

Furthermore, in Condition 2, a determination whether the value from the sensor shows a change of an increasing trend or of a reduction trend means a determination in which a differential value between a first value acquired at a predetermined timing and a second value acquired at the subsequent timing is calculated for the individual sensors, the sum total of the calculated differential values is further calculated, and it is determined whether the sum total value tends to increase or tends to reduce.

Figure 13:
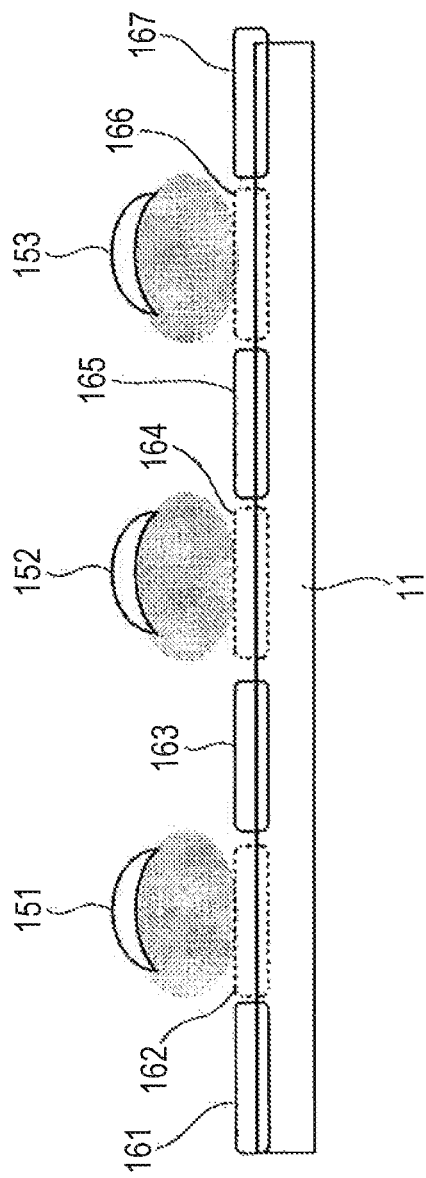
FIG. 13 is a diagram illustrating sensor values when manipulated by the fingers.

Condition 3 and Condition 4 will be described with reference to FIG. 13. FIG. 13 is the state in which the upper touch panel 11 is touched by the fingers. The state illustrated in FIG. 13 is the state in which three fingers, a finger 151, a finger 152, and a finger 153, touch the upper touch panel 11. This state is a state that possibly occurs when a manipulation is performed by multitouch, for example. Multitouch means a technique in which simultaneous touches are made at a plurality of points on a touch panel for performing a predetermined manipulation.

Suppose that predetermined sensors on the upper touch panel 11 are sensors 161 to 167. The finger 151 touches the sensor 162, the finger 152 touches the sensor 164, and the finger 153 touches the sensor 166. The values of the sensor 162, the sensor 164, and the sensor 166 touched by the fingers show values greater than the values of the sensor 161, the sensor 163, the sensor 165, and the sensor 167 touched by no fingers.

Thus, in the case where the difference between the sensor values before and after the finger touches is calculated, the differential values of the sensor 162, the sensor 164, and the sensor 166 are increased, whereas the differential values of the sensor 161, the sensor 163, the sensor 165, and the sensor 167 are not changed. As described above, even in the adjacent sensors, there is a great difference in the magnitude of the differential value between the sensor touched by the finger and the sensor touched by no finger. As described above, in the case of the state in which the finger touches the sensor, the magnitude of the differential value is varied between the sensors.

On the other hand, the magnitude of the differential value is not varied so much between the sensors on predetermined TX electrodes in the region 21 because force is applied uniformly to some extent, not equally, in the closing state. Again referring to FIG. 12, for example, the maximum value of the differential value is 18 from an angle of zero degree to an angle of 15 degrees, the minimum value is 12, and the difference is six (=18−12). Although not illustrated in the drawing, since the differential values of the sensor values are varied greatly when the fingers touch sensors, for example, the differential value between the maximum value and the minimum value of this differential value is also a large value.

From the fact, a condition is provided as Condition 3, in which the differential value from the previously detected value is not varied in the sensors. When this condition 3 is satisfied, it can be determined that an increase in the differential value of the sensor is not caused by the finger touching the sensor. In other words, in the case where the differential values are varied greatly, it is highly likely that multiple fingers touch the sensors on a specific line. Therefore, Condition 3 is provided so as to determine that the differential values are not changed in association with the closing motion.

As described later in the calculation using a flowchart, whether to satisfy Condition 3 is determined in which a differential value between a first value acquired at a predetermined timing and a second value acquired at the subsequent timing is calculated for the individual sensors, the difference between the maximum differential value and the minimum differential value is further calculated, and then it is determined whether the difference is in a predetermined range.

Condition 4 will be described. It is likely that it is not enabled to distinguish a finger touch when the differential value is increased at one or two sensors. As the state illustrated in FIG. 13, such a state is considered that three fingers touch the upper touch panel 11 and only seven sensors are provided. In this case, the sensor value is increased at three sensors of seven sensors because the fingers touch the sensors. In this case, the ratio is 3/7.

Supposing that the ratio is 2/7 when two fingers touch the sensors, the ratio is 1/7 when a finger touches the sensor. The ratio is 5/7 even though five fingers are placed on the same line. Thus, when the ratio is 5/7 or less, it is likely that the fingers are placed on the same line, and when the ratio is 5/7 or more, the possibility can be eliminated that the fingers are placed on the same line. Therefore, such a condition is provided for Condition 4 in which the sensors whose differential value is increased more than the previously detected value are at a certain rate in the individual sensors.

This certain rate is determined in consideration of various conditions. For example, the sizes of human fingers are varied. In some cases, the finger size is the size that one finger touches a single sensor, and the finger size is the size that one finger touches two sensors. Moreover, as illustrated in FIG. 13, the size of a single sensor is not sometimes matched with the size of one finger. The ratio (the threshold) in Condition 4 is set in consideration of these various conditions.

As described later in the calculation using a flowchart, whether to satisfy Condition 4 is determined in which a differential value between a first value acquired at a predetermined timing and a second value acquired at the subsequent timing is calculated for the individual sensors and it is determined whether the number of the sensors whose differential value is increased or reduced is a predetermined value (a threshold) or more.

When these conditions 1 to 4 are satisfied, it is determined that the state is the state in which the upper touch panel 11 is being closed. It is noted that in the following description, the description is continued as it is determined that the state is the state in which the upper touch panel 11 is being closed when these four conditions are satisfied. However, this description does not always mean that it is designed so as to satisfy these four conditions. For example, such a configuration may be possible in which it is determined that the state is the state in which the upper touch panel 11 is being closed when only one condition of these four conditions is satisfied.

Moreover, such a configuration may be possible in which it is determined that the state is the state in which the upper touch panel 11 is being closed when two or three conditions of these four conditions are satisfied. Furthermore, such a configuration may also be possible in which only one condition is set, two conditions are set, or three conditions are set, not setting these four conditions.

The conditions for determining that the state is the state in which the upper touch panel 11 is being opened are four conditions below. The conditions will be described with a dash for distinguishing between these conditions and the conditions for determining that the state is the closing state.

Condition 1' in which the number of the sensors whose differential value from the previously detected value is reduced is increasing in the sensors.

Condition 2' in which the sum total of the differential values is continuously reduced.

Condition 3' in which the differential value from the previously detected value is not varied in the sensors.

Condition 4' in which the sensors whose differential value from the previously detected value is reduced are at a certain rate.

Condition 1' is a condition in the converse relationship with Condition 1, and is a condition for determining that the state is the opening state when the number of the sensors whose differential value is reduced is increasing. Condition 2' is also a condition in the converse relationship with Condition 2, and is a condition for determining that the state is the opening state when the sum total of the differential values is continuously reduced.

Condition 3' is a condition the same as Condition 3. Condition 3' is a condition for determining whether the state is the state in which the finger touches the sensor or the opening state. This condition can be a condition for determining whether the state is the state in which the finger touches the sensor or the closing state, that is, a condition similar to Condition 3.

Condition 4' is a condition in the converse relationship with Condition 4, and is a condition for determining whether the state is the state in which the finger touches the sensor or the opening state when the sensors whose differential value from the previously detected value is reduced are at a certain rate.

[The Opening and Closing Motion Monitoring Process]

Figure 14:
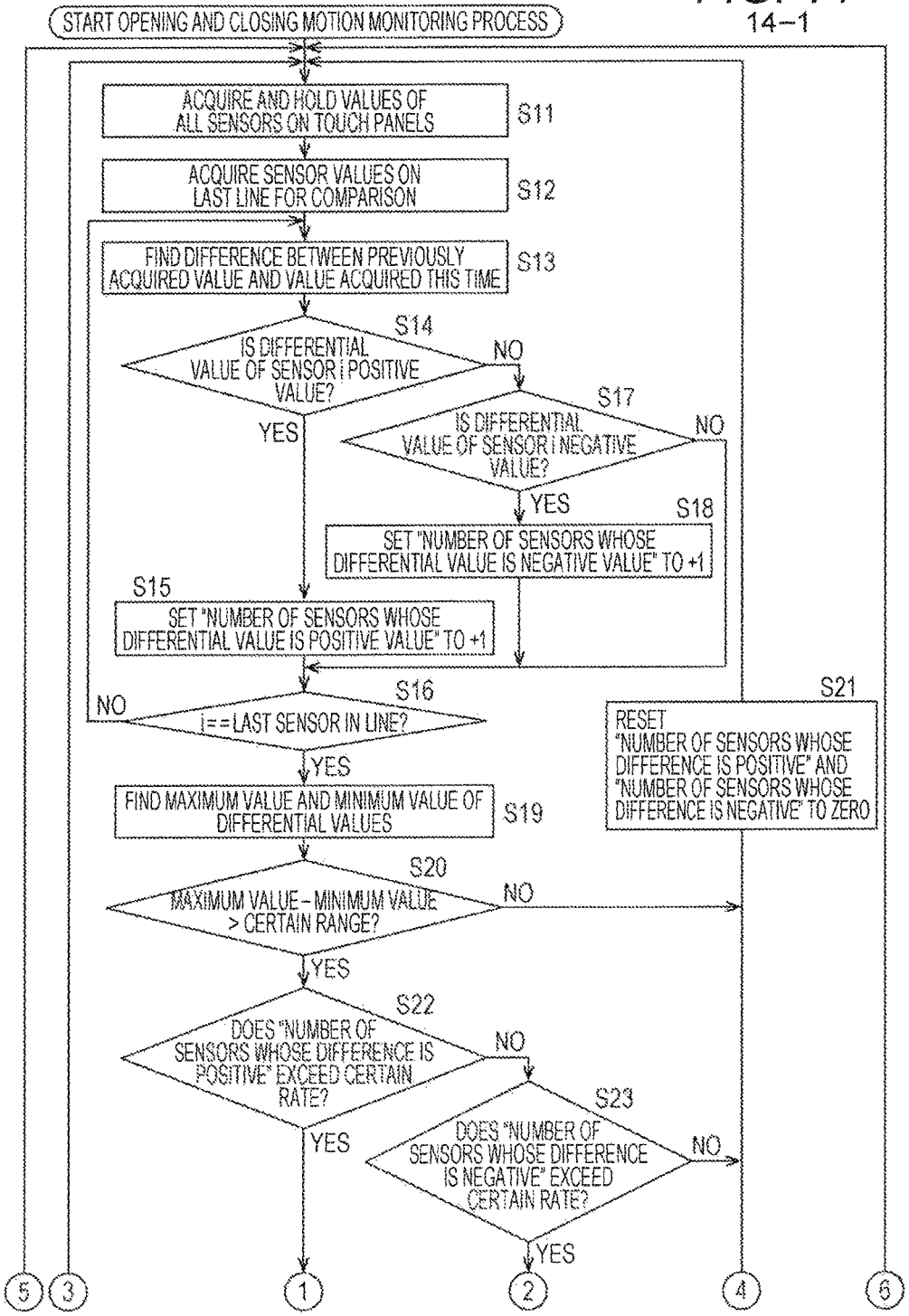
FIG. 14 is a flowchart illustrating an opening and closing motion monitoring process.

Next, a process for monitoring opening and closing motions in which it is determined whether the upper touch panel 11 of the information processing apparatus 10 is being opened or closed based on Conditions 1 to 4 (Conditions 1' to 4') described above will be described with reference to flowcharts in FIGS. 14 and 15.

The process for monitoring opening and closing motions described below is a process applicable to an information processing apparatus including at least two surfaces, in which the relative position between one surface and the other surface of the two surfaces is changed. Here, the description will be given supposing that two surfaces are the upper touch panel 11 and the lower touch panel 12. Moreover, an example will be taken and described in which a change in the relative position between one surface and the other surface of the two surfaces is that an angle formed between the upper touch panel 11 and the lower touch panel 12 is changed in the range of an angle of zero degree to an angle of 90 degrees, for example.

Furthermore, the process for monitoring opening and closing motions described below is a process for detecting that the relative position between the two surfaces is changed, from a change in a plurality of values of the sensors included in a predetermined region of at least one surface of the two surfaces. Namely, the process is a process that one or both of the upper touch panel 11 and the lower touch panel 12 detect that an angle formed between the upper touch panel 11 and the lower touch panel 12 is changed, from a change in the sensor values using the sensor values included in the region 21 or the region 22.

The process for monitoring opening and closing motions described below is performed by at least one of the upper touch panel 11 and the lower touch panel 12.

In Step S11, the values of all the sensors on the upper touch panel 11 and the lower touch panel 12 are acquired and held at the individual sampling frequencies. The process is a process generally performed at predetermined periods for detecting whether which portion on the upper touch panels 11 and 12 is manipulated (which portion the finger touches).

In Step S12, sensor values on the last line for comparison are acquired from all the held sensor values. Here, as decried above, the description is continued as sensor values on a line of the TX electrode 09 in the region 21 of the upper touch panel 11 are acquired.

In Step S13, the difference between the previously acquired value and the value acquired this time is found. As described with reference to FIGS. 10 to 12, for example, in Step S12, in the case where the sensor value at an angle of 45 degrees is acquired and the value acquired at the previous point in time is a sensor value at an angle of 60 degrees, the sensor value at an angle of 45 degrees is subtracted from the sensor value at an angle of 60 degrees, and the differential value is calculated for the sensors.

In Step S14, it is determined whether the differential value of a sensor i for processing is a positive (+) value. In this case, i expresses the number of the RX electrodes, and takes values from 00 to 21. In Step S14, in the case where it is determined that the differential value of the sensor i is a positive value, the process is advanced to Step S15.

In Step S15, "the number of the sensors whose differential value is a positive value" is increased by +1. "The number of the sensors whose differential value is a positive value" is a parameter for storing how many sensors have a changed value because the sensor value is increased more than the previously acquired value in the sensors in the case of the "closing" motion. Moreover, "the number of the sensors whose differential value is a positive value" is counted for determining whether the state is the closing state, and is counted for determining whether Condition 1 described above is satisfied.

In Step S16, it is then determined whether i is the last sensor in the line. In this case, it is determined as YES at a point in time at which i reaches 21, whereas it is determined as NO when i is 21 or less. In Step S16, in the case where it is determined as NO, the process is returned to Step S13, and the processes after that are repeated. On the other hand, in Step S16, in the case where it is determined as YES, the process is advanced to Step S19.

On the other hand, in Step S14, in the case where it is determined that the differential value of the sensor i is not a positive value, the process is advanced to Step S17. In Step S17, it is determined whether the differential value of the sensor i is a negative (−) value. In Step S17, in the case where it is determined that the differential value of the sensor i is a negative (−) value, the process is advanced to Step S18.

In Step S18, "the number of the sensors whose differential value is a negative value" is increased by one. "The number of the sensors whose differential value is a negative value" is a parameter for storing the number how many sensors have a changed value because the sensor value is reduced as compared with the previously acquired value in the sensors in the case of the "opening" motion. "The number of the sensors whose differential value is a negative value" is counted for determining whether the state is the opening state, and is counted for determining whether Condition 1' described above is satisfied. When the counting is finished, the process is advanced to Step S16.

On the other hand, in Step S17, also in the case where it is determined that the differential value of the sensor i is not a negative value, the process is advanced to Step S16. This case is the case where it is determined that the differential value of the sensor i is not either a positive value or a negative value and it is determined that the value is zero.

In Step S16, in the case where it is determined that i is not the last sensor in the line as described above, the process is returned to Step S13, and the processes after that are repeated. In the case where it is determined that i is the last sensor, the process is advanced to Step S19.

In Step S19, the maximum value and the minimum value of the differential values are found. In Step S20, it is then determined whether the value that the minimum value is subtracted from the maximum value is in a certain range of the maximum value to the minimum value. The determination is a process for determining whether Condition 3 or Condition 3' is satisfied.

A certain range of the maximum value to the minimum value is a value set in which in the case where the differential values are varied, it can be determined that the motion is a finger touch, not the "closing/opening" motion as described above, and it can be recognized that the motion is not caused by the finger when the value is within the preset range of the maximum value to the minimum value of the differential values. This value is set by a designer when designed, for example.

In Step S20, in the case where it is determined that the value that the minimum value is subtracted from the maximum value is not in a certain range of the maximum value to the minimum value, the process is advanced to Step S21. In this case, since it is determined that the sensor value is highly likely changed because of a finger touch, in Step S21, "the counted number of the sensors whose difference is positive" and "the counted number of the sensors whose difference is negative" are reset to zero. The process is then returned to Step S11, and the processes after that are repeated.

On the other hand, in Step S20, in the case where it is determined that the value that the minimum value is subtracted from the maximum value is in a certain range of the maximum value to the minimum value, that is, in the case where it is determined that Condition 3 (Condition 3') is satisfied, the process is advanced to Step S22.

In Step S22, it is determined whether "the number of the sensors whose difference is positive" exceeds a certain rate. The determination in Step S22 is a determination whether Condition 4 is satisfied. The condition that "the number of the sensors whose difference is positive" exceeds a certain rate is a threshold provided for identifying whether it is a "closing" motion when some sensor values are increased, and the threshold is a value set by a designer when designed, for example.

In Step S22, in the case where it is determined that "the number of the sensors whose difference is positive" does not exceed a certain rate, the process is advanced to Step S23. In Step S23, it is determined whether "the number of the sensors whose difference is negative" exceeds a certain rate. The determination in Step S23 is a determination whether Condition 4' is satisfied. Moreover, the condition that "the number of the sensors whose difference is negative" exceeds a certain rate is a threshold provided for identifying whether it is an "opening" motion when some sensor values are reduced, and the threshold is a value set by a designer when designed, for example.

In Step S23, in the case where it is determined that "the number of the sensors whose difference is negative" does not exceed a certain rate, the process is advanced to Step S21. Since this case is the case where it is determined that Condition 4 and Condition 4' are not satisfied, it is determined that the sensor value is highly likely changed because of a finger touch. Thus, in Step S21, "the counted number of the sensors whose difference is positive" and "the counted number of the sensors whose difference is negative" are reset to zero. The process is then returned to Step S11, and the processes after that are repeated.

Figure 15:
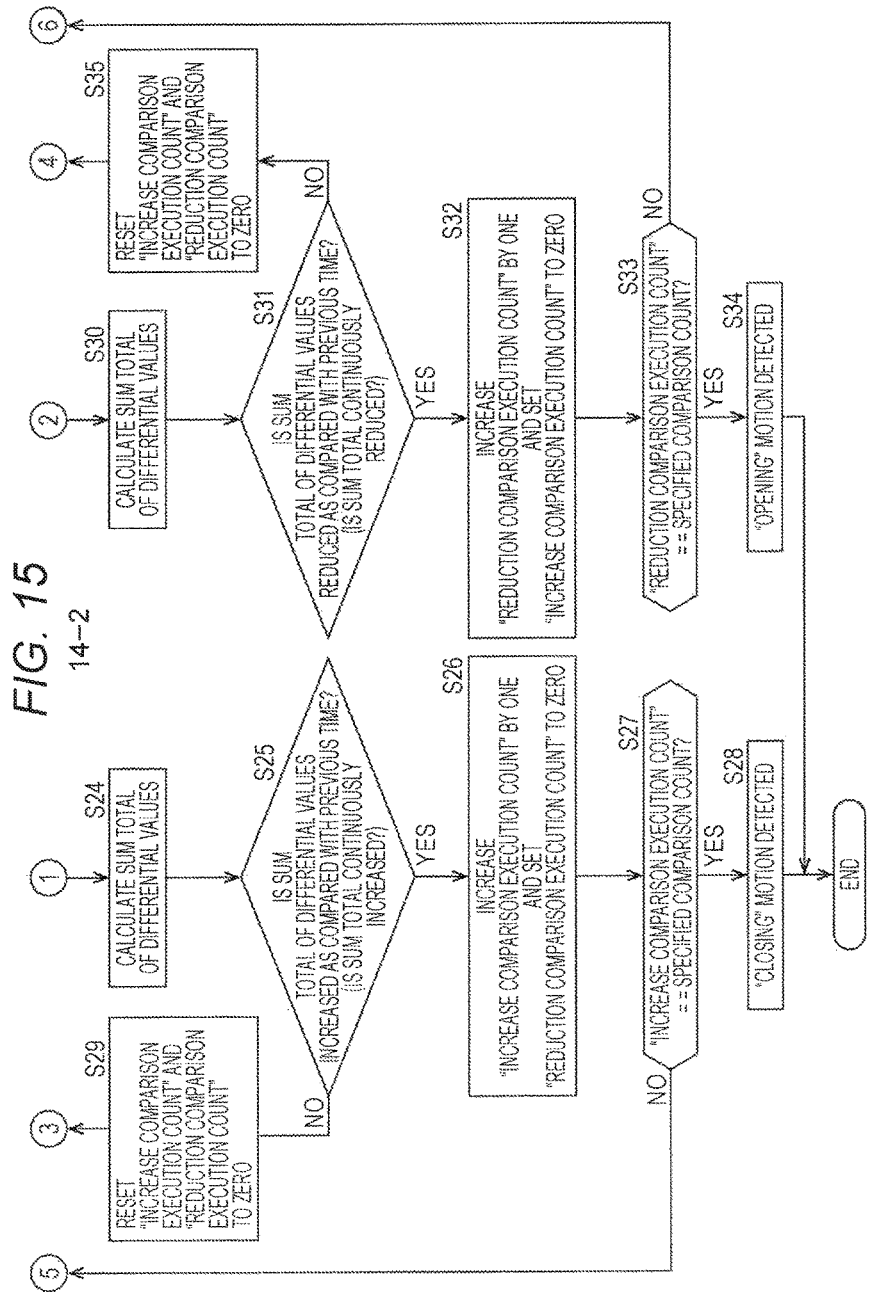
FIG. 15 is a flowchart illustrating the opening and closing motion monitoring process.

On the other hand, in Step S22, in the case where it is determined that "the number of the sensors whose difference is positive" exceeds a certain rate, the process is advanced to Step S24 (FIG. 15). In this case, since it is determined that Condition 4 is satisfied, it is likely that the state is the closing state. Therefore, in Step S24, the sum total of the differential values is calculated. When the sum total of the differential values is calculated, in Step S25, it is determined whether the sum total of the differential values is increased as compared with the previous sum total of the differential values, and it is determined whether the sum total is continuously increased.

The determination in Step S25 is a process for determining whether Condition 2 is satisfied. In Step S25, in the case where it is determined that the sum total of the differential values is continuously increased, that is, in the case where it is determined that Condition 2 is satisfied, the process is advanced to Step S26.

In Step S26, "an increase comparison execution count" is increased by one, and "a reduction comparison execution count" is set to zero. "The increase comparison execution count" and "the reduction comparison execution count" are parameters for storing how many times the sum total is continuously increased or reduced.

When the process is advanced to Step S27, it is determined whether "the increase comparison execution count" reaches a specified comparison count. The specified comparison count is a threshold for determining whether it is a "closing" or "opening" motion when the sum total is continuously increased or reduced for certain times, and the threshold is a value set by a designer when designed, for example.

For example, it is determined that the sum total of the differential values is continuously increased just once, when the state is determined as to be closed, it is likely that the determination is wrong. Therefore, the process in Step S27 is provided so as to determine that the state is to be closed in the case where it is determined that the sum total of the differential values is continuously increased for a predetermined number of times. Moreover, preferably, for the specified comparison count, the minimum value that does not cause a faulty detection is set.

In Step S27, in the case where it is determined that "the increase comparison execution count" reaches the specified comparison count, the process is advanced to Step S28. In Step S28, the determined result is outputted that a "closing" motion is detected. A process corresponding to this determined result is performed, but the process will be described later. The description of the flowchart is continued first.

On the other hand, in Step S27, in the case where it is determined that "the increase comparison execution count" does not reach the specified comparison count, the process is returned to Step S11 (FIG. 14), and the processes after that are repeated. Namely, the process is repeated until the specified comparison count is reached.

On the other hand, in Step S25, in the case where it is determined that the sum total of the differential values is not continuously increased, that is, in the case where it is determined that the upper touch panel 11 is highly likely manipulated by the finger, the process is advanced to Step S29. In Step S29, "the increase comparison execution count" and "the reduction comparison execution count" are both reset to zero. The process is then returned to Step S11 (FIG. 14), and the processes after that are repeated.

In this manner, the state in which the upper touch panel 11 is being closed is detected.

On the other hand, in the case where it is determined that "the number of the sensors whose differential value is a negative value" exceeds a certain rate in Step S23 (FIG. 14), the process is advanced to Step S30 (FIG. 15). In this case, since it is determined that Condition 4' is satisfied, it is likely that the state is the opening state. Therefore, in Step S30, the sum total of the differential values is calculated. When the sum total of the differential values is calculated, in Step S31, it is determined whether the sum total of the differential values is reduced as compared with the previous sum total of the differential values, and it is determined whether the sum total is continuously reduced.

The determination in Step S31 is a process for determining whether Condition 2' is satisfied. In Step S31, in the case where it is determined that the sum total of the differential values is continuously reduced, that is, in the case where it is determined that Condition 2' is satisfied, the process is advanced to Step S32.

In Step S32, "the reduction comparison execution count" is increased by one, and "the increase comparison execution count" is set to zero. The process is then advanced to Step S33, and it is determined whether "the reduction comparison execution count" reaches the specified comparison count. As similar to Step S27, for example, when it is determined that the state is the opening state in the case where it is determined that the sum total of the differential values is continuously reduced for one time also in Step S33, it is likely that the determination is wrong. Thus, the process in Step S33 is provided so as to determine that the state is the opening state in the case where it is determined that the sum total of the differential values is continuously reduced for a predetermined number of times.

In Step S33, in the case where it is determined that "the reduction comparison execution count" reaches the specified comparison count, the process is advanced to Step S34. In Step S34, the determined result is outputted that an "opening" motion is detected. A process corresponding to this determined result is performed, but the process will be described later. The description of the flowchart is continued first.

On the other hand, in Step S33, in the case where it is determined that "the reduction comparison execution count" does not reach the specified comparison count, the process is returned to Step S11 (FIG. 14), and the processes after that are repeated. Namely, the process is repeated until the specified comparison count is reached.

On the other hand, in Step S31, in the case where it is determined that the sum total of the differential values is not continuously reduced, that is, in the case where it is determined that the upper touch panel 11 is highly likely manipulated by the finger, the process is advanced to Step S35. In Step S35, "the increase comparison execution count" and "the reduction comparison execution count" are both reset to zero. The process is then returned to Step S11 (FIG. 14), and the processes after that are repeated.

In this manner, the state in which the upper touch panel 11 is being opened is detected.

[the Process when Opening or Closing is Detected]

Next, a process when the state is detected that the upper touch panel 11 is being closed or opened by the process described above will be described. Here, again referring to FIG. 6, notifying the coordinate value to the upper layer is referred to as an event in the following description.

In the case where a closing state is detected by performing the process described above in the upper touch panel 11 or the lower touch panel 12, it can be prevented that the application 92 malfunctions by not notifying the coordinate value to the application 92 by event.

In the case where an opening state is detected by performing the process described above in the upper touch panel 11 or the lower touch panel 12, notifying the coordinate value to the application 92 is resumed by event, and the state is again turned to the state manipulatable by the upper touch panel 11 and the lower touch panel 12.

As described above, in the case where a closing state is detected, that is, in the case where an opening state is detected in which an event is not notified to the application 92, such a process is performed that the notification of an event to the application 92 is resumed. Four methods for performing this process will be described.

In Method 1, only the upper touch panel 11 performs the monitoring operation. When a closing or opening motion is detected, the detection is also notified to the lower touch panel 12, and an event is then outputted or stopped. Method 1 is a method in which an event is not notified to the layer above the touch panel. The monitoring operation may be performed only by the lower touch panel 12, not by the upper touch panel 11.

In Method 2, the monitoring operation is performed in both of the upper touch panel 11 and the lower touch panel 12. When a closing or opening motion is detected in one of the touch panels, the detection is then also notified to the other touch panel, and an event is outputted or stopped. Method 2 is also a method in which an event is not notified to the layer above the touch panel.

In Method 3, only the upper touch panel 11 performs the monitoring operation as similar to Method 1. When a closing or opening motion is detected, the detection is notified to the operating system 91, and the operating system 91 then outputs or stops an event to the application 92. Method 3 is a method in which an event is not notified to the layer above the operating system 91. The monitoring operation may be performed only by the lower touch panel 12, not by the upper touch panel 11.

In Method 4, the monitoring operation is performed in both of the upper touch panel 11 and the lower touch panel 12 as similar to Method 2. When a closing or opening motion is detected in one of the touch panels, the detection is then notified to the operating system 91, and the operating system 91 outputs or stops an event to the application 92. Method 4 is also a method in which an event is not notified to the layer above the operating system 91.

Although it is likely that the detection speed is reduced in Method 1 more than in Method 2, only one touch panel performs the monitoring operation, so that the computational complexity can be reduced. The detection speed can be increased in Method 2 more than in Method 1.

Any one of Method 1 and Method 2 is applied. Alternatively, the combination of Method 1 and Method 2 may be applied. In the case where the combined methods are applied, for example, it may be fine that Method 2 is applied in the initial state in which the information processing apparatus 10 is used and the application of Method 2 is switched to Method 1 after a lapse of a predetermined period. It may be fine that in the case where one of the upper touch panel 11 and the lower touch panel 12 makes continuous detections for a predetermined number of times during the application of Method 2, the application of Method 2 is switched to Method 1 in which only the touch panel that makes continuous detections performs the monitoring operation.

Although it is likely that the detection speed is reduced in Method 3 more than in Method 4, only one touch panel performs the monitoring operation, so that the computational complexity can be reduced. The detection speed can be increased in Method 4 more than in Method 3.

As similar to the relationship between Method 1 and Method 2, one of Method 3 and Method 4 is applied. Alternatively, the combination of Method 3 and Method 4 may be applied. For example, it may be fine that Method 4 is applied in the initial state in which the information processing apparatus 10 is used and the application of Method 4 is switched to Method 3 after a lapse of a predetermined period. It may be fine that in the case where one of the upper touch panel 11 and the lower touch panel 12 makes continuous detections for a predetermined number of times during the application of Method 4, the application of Method 4 is switched to Method 3 in which only the touch panel that makes continuous detections performs the monitoring operation.

[The Process according to Method 1]

First, the process according to Method 1 will be described. Here, the description will be given supposing that the upper touch panel 11 performs the monitoring operation. In Method 1, the upper touch panel 11 monitors opening and closing motions in which when opening or closing is detected, the upper touch panel 11 notifies the lower touch panel 12, and the upper touch panel 11 and the lower touch panel 12 output, resume, or stop events. Thus, since the upper touch panel 11 and the lower touch panel 12 individually perform processes, the process performed by the upper touch panel 11 will be described with reference to a flowchart in FIG. 16, and the process performed by the lower touch panel 12 will be described with reference to a flowchart in FIG. 17.

Figure 16:
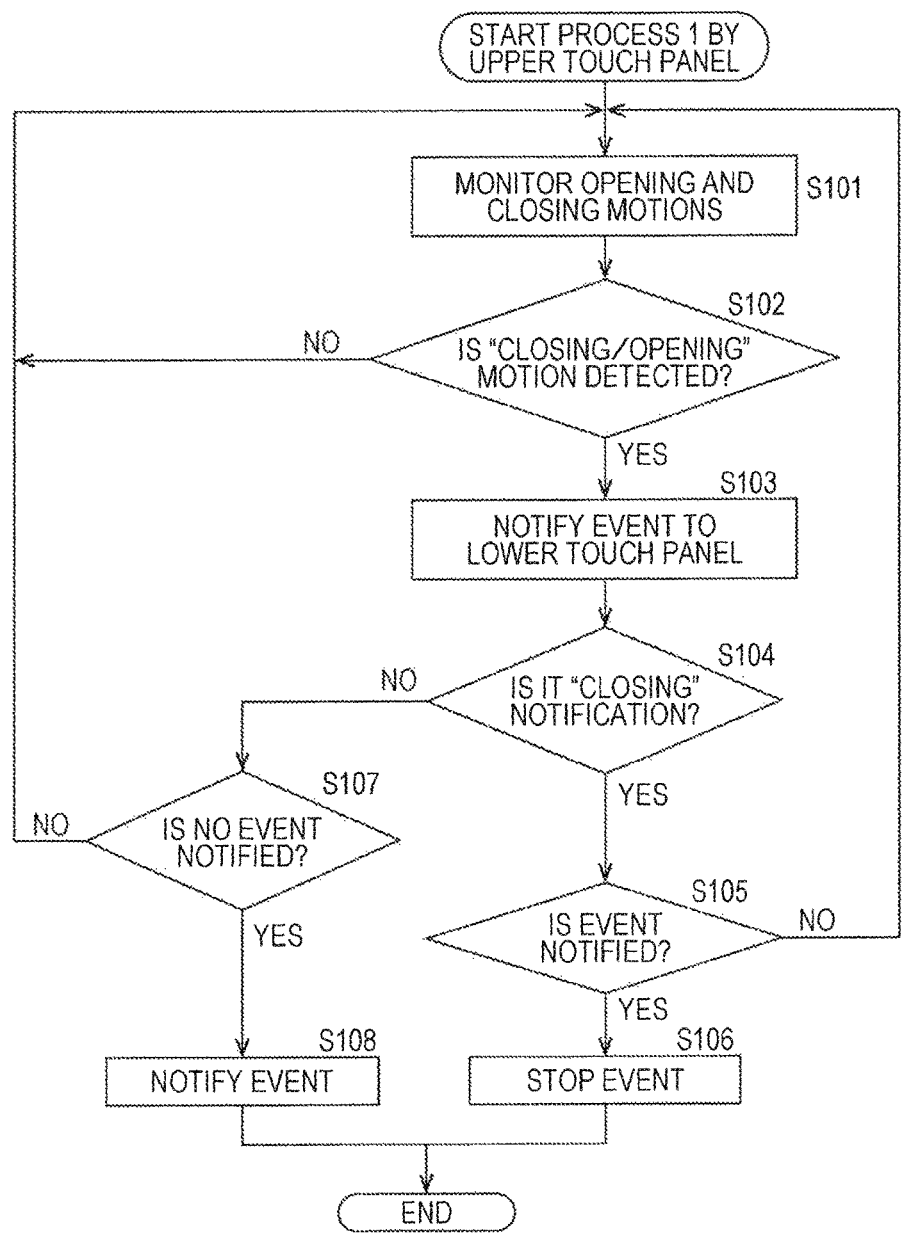
FIG. 16 is a flowchart illustrating a process performed by a touch panel based on the monitored result.

FIG. 16 is a flowchart illustrating the process performed by the upper touch panel 11. In Step S101, opening and closing motions are monitored. The process in Step S101 means that the processes of the flowcharts illustrated in FIGS. 14 and 15 are performed. The opening and closing motions are monitored, and the state in which the upper touch panel 11 is being closed or opened is detected. It is determined in Step S102 whether such detection is made.

In Step S102, in the case where it is determined that a closing or opening motion is not detected, the process is returned to Step S101, and the processes after that are repeated.

On the other hand, in Step S102, in the case where it is determined that a closing or opening motion is detected, the process is advanced to Step S103. In Step S103, the upper touch panel 11 notifies the lower touch panel 12 that a closing or opening motion is detected. The process of the lower touch panel 12 that receives a notification will be described later with reference to the flowchart in FIG. 17.

In Step S103, the lower touch panel 12 is notified, and it is determined whether a "closing" motion is detected in Step S104. In Step S104, in the case where it is determined that a "closing" motion is detected, the process is advanced to Step S105. In Step S105, it is determined whether the state is the state in which an event is notified to the operating system 91.

In Step S105, in the case where it is determined that the state is the state in which an event is notified, the process is advanced to Step S106, and the notification of an event to the operating system 91 is stopped.

As described above, in the case where a closing state is detected in the state in which the upper touch panel 11 notifies an event to the operating system 91, the operation of notifying an event to the operating system 91 is stopped.

On the other hand, in the case where it is determined that an event is not notified in Step S105, since it can be determined that the state is the state in which the notification of an event is already stopped, the process is returned to Step S101, and goes to the process for the subsequent detection. As described above, the state is turned to the state in which an event is not notified to the operating system 91, and an event is not notified to the application 92 above the operating system 91, so that it can be prevented that a malfunction occurs because of a finger touch even though the finger, for example, touches the upper touch panel 11 in the closing state.

On the other hand, in Step S104, in the case where it is determined that a "closing" motion is not detected, the process is advanced to Step S107. In this case, since it is not a "closing" motion, an "opening" motion is detected. In the case where it is determined that an "opening" motion is detected as described above, in Step S107, it is determined whether the state is the state in which an event is not notified to the operating system 91.

In Step S107, in the case where it is determined that the state is the state in which an event is not notified to the operating system 91, the process is advanced to Step S107, and the operation of notifying an event to the operating system 91 is resumed.

As described above, in the case where an opening state is detected in the state in which the upper touch panel 11 does not notify an event to the operating system 91, the operation of notifying an event to the operating system 91 is resumed. Thus, the state can be already set in which the application 92 receives an event from the upper touch panel 11 when the user opens the upper touch panel 11 at a desired angle. Thus, a manipulation from the user can be promptly received to start the process.

On the other hand, in Step S107, in the case where it is determined that the state is the state in which an event is notified to the operating system 91, since it can be determined that the state is the state in which the notification of an event is already resumed, the process is returned to Step S101, and goes to the process for the subsequent detection.

In the upper touch panel 11 that monitors opening and closing motions, this process is performed. The lower touch panel 12 then receives a notification from the upper touch panel 11, and performs the process of the flowchart in FIG. 17.

In Step S131, the lower touch panel 12 receives a notification from the upper touch panel 11, and confirms the content. In Step S132, it is determined whether a "closing" motion is detected using the confirmed result. The processes after the process in Step S132 are similarly performed as the processes after the process in Step S104 described above, and the detailed descriptions are omitted.

Namely, although the lower touch panel 12 does not monitor opening and closing motions, the lower touch panel 12 is supplied with the monitored result from the upper touch panel 11, and performs the process for notifying an event or for stopping the notification of an event to the operating system 91 as similar to the upper touch panel 11.

The processes described with reference to FIGS. 16 and 17 include a process in which in the case where at least one touch panel of two surfaces configured of the upper touch panel 11 and the lower touch panel 12 monitors opening and closing motions and the touch panel monitoring opening and closing motions detects a change in the relative position between the two surfaces, the other touch panel is notified of the detection. The processes include a process in which after giving the notification, in the case where the two touch panels notify an event to the operating system 91, the two touch panels stop notifying an event to the operating system 91, and in the case where the two touch panels do not notify an event to the operating system 91, the two touch panels notify an event to the operating system 91.

Figure 17:
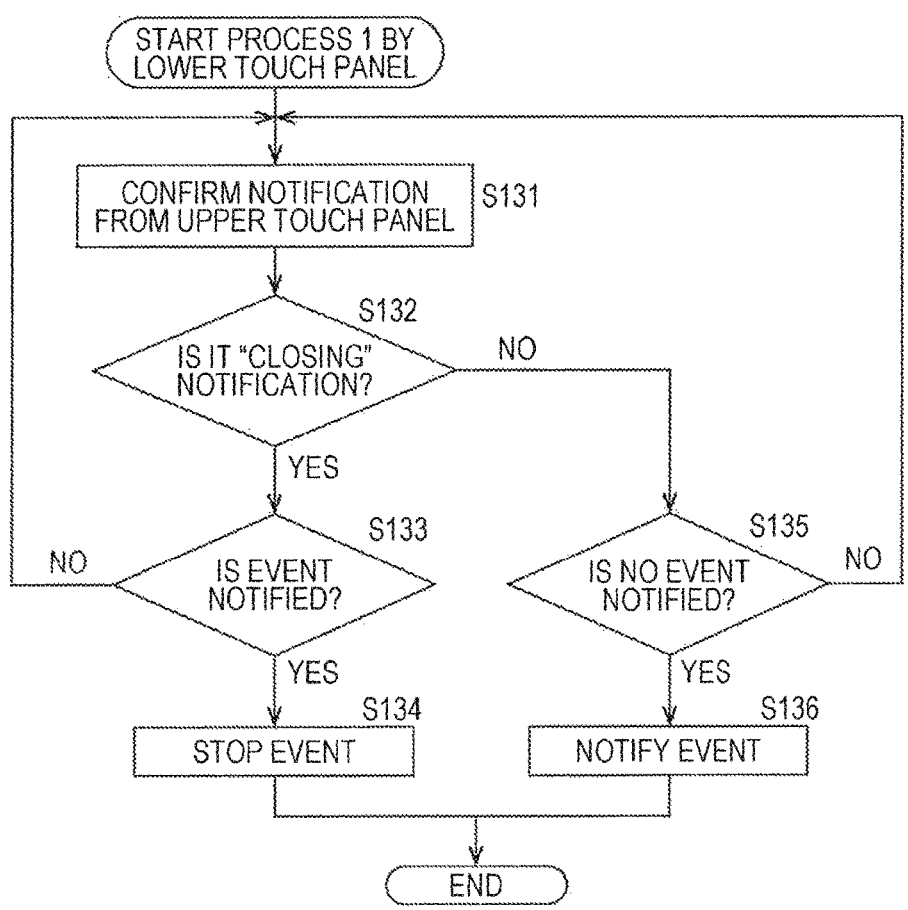
FIG. 17 is a flowchart illustrating a process performed by a touch panel based on the monitored result.

It is noted that in the case where the lower touch panel 12 monitors opening and closing motions, the lower touch panel 12 performs the process of the flowchart illustrated in FIG. 16, and the upper touch panel 11 performs the process of the flowchart illustrated in FIG. 17.

Moreover, in the case of an information processing apparatus 10 including one of the upper touch panel 11 or the lower touch panel 12 (an information processing apparatus 201 described later with reference to FIG. 23, for example), the process for notifying the other touch panel of the detection can be omitted in the case where the touch panel monitoring opening and closing motions detects a change in the relative position between the two surfaces. The present technique is also applicable to an embodiment like this.

[The Process according to Method 2]

Next, the process according to Method 2 will be described. Method 2 is a process including a process in which both of the upper touch panel 11 and the lower touch panel 12 perform the monitoring operation and the other is notified when one of the touch panels detects opening and closing motions. First, the process performed by the upper touch panel 11 will be described with reference to a flowchart in FIG. 18.

In Step S201, opening and closing motions are monitored. In Step S202, the result of monitoring opening and closing motions is used, and it is determined whether a "closing" or "opening" motion is detected. When it is determined that a motion is detected, the process is advanced to Step S203. In Step S203, the lower touch panel 12 is notified that a motion is detected. The processes in Steps S201 to S203 are similarly performed as the processes in Steps S101 to S103 in FIG. 16. However, in Step S202, in the case where a "closing" or "opening" motion is not detected, the process is advanced to Step S204.

In Step S204, a notification from the lower touch panel 12 is confirmed. In the confirmation, it is confirmed whether the lower touch panel 12 gives a notification. In the case where a notification is given, the content is confirmed. In Step S205, it is then determined whether the upper touch panel 11 or the lower touch panel 12 notifies that a "closing" motion is detected. In Step S205, in the case where it is determined that the detection of a "closing" motion is notified from the upper touch panel 11 or the lower touch panel 12, the process is advanced to Step S206.

In Step S206, it is determined whether the state is the state in which an event is notified to the operating system 91. In Step S206, in the case where it is determined that the state is the state in which an event is notified to the operating system 91, the process is advanced to Step S207, and the operation of notifying an event to the operating system 91 is stopped.

As described above, in the case where a closing state is detected in one of the upper touch panel 11 or the lower touch panel 12 in the state in which the upper touch panel 11 notifies an event to the operating system 91, the operation of notifying an event to the operating system 91 is stopped.

On the other hand, in the case where it is determined that an event is not notified to the operating system 91 in Step S206, since it can be determined that the state is the state in which the notification of an event is already stopped, the process is returned to Step S201, and goes to the process for the subsequent detection. As described above, the state is turned to the state in which an event is not notified to the operating system 91, so that it can be prevented that the application 92 malfunctions because of a finger touch even though the finger, for example, touches the upper touch panel 11 in the closing state.

On the other hand, in Step S205, in the case where it is determined that the upper touch panel 11 or the lower touch panel 12 does not notify that a "closing" motion is detected, the process is advanced to Step S208. In Step S208, it is determined whether the upper touch panel 11 or the lower touch panel 12 notifies that an "opening" motion is detected.

In Step S208, in the case where it is determined that the detection of an "opening" motion is notified from the upper touch panel 11 or the lower touch panel 12, the process is advanced to Step S209. In Step S209, it is determined whether the state is the state in which an event is not notified to the operating system 91. In Step S209, in the case where it is determined that the state is the state in which an event is not notified to the operating system 91, the process is advanced to Step S210, and the state is turned to the state in which an event is notified to the operating system 91.

As described above, in the case where an opening state is detected in one of the upper touch panel 11 or the lower touch panel 12 in the state in which the upper touch panel 11 does not notify an event to the operating system 91, the operation of notifying an event to the operating system 93 is resumed. Thus, the state can be already set in which the application 92 receives an event from the upper touch panel 11 when the user opens the upper touch panel 11 at a desired angle. Thus, a manipulation from the user can be promptly received to start the process.

On the other hand, in Step S209, in the case where it is determined that the state is the state in which an event is notified to the operating system 91, since it can be determined that the state is the state in which the notification of an event is already resumed, the process is returned to Step S201, and goes to the process for the subsequent detection.

Moreover, in Step S208, in the case where it is determined that the upper touch panel 11 or the lower touch panel 12 does not notify that an "opening" motion is detected, the process is returned to Step S201, and the processes after that are repeated. In this case, since the state is such that neither a "closing" motion nor an "opening" motion is detected from both of the upper touch panel 11 and the lower touch panel 12, the process is returned to Step S201, and the processes after that are repeated.

Figure 19:
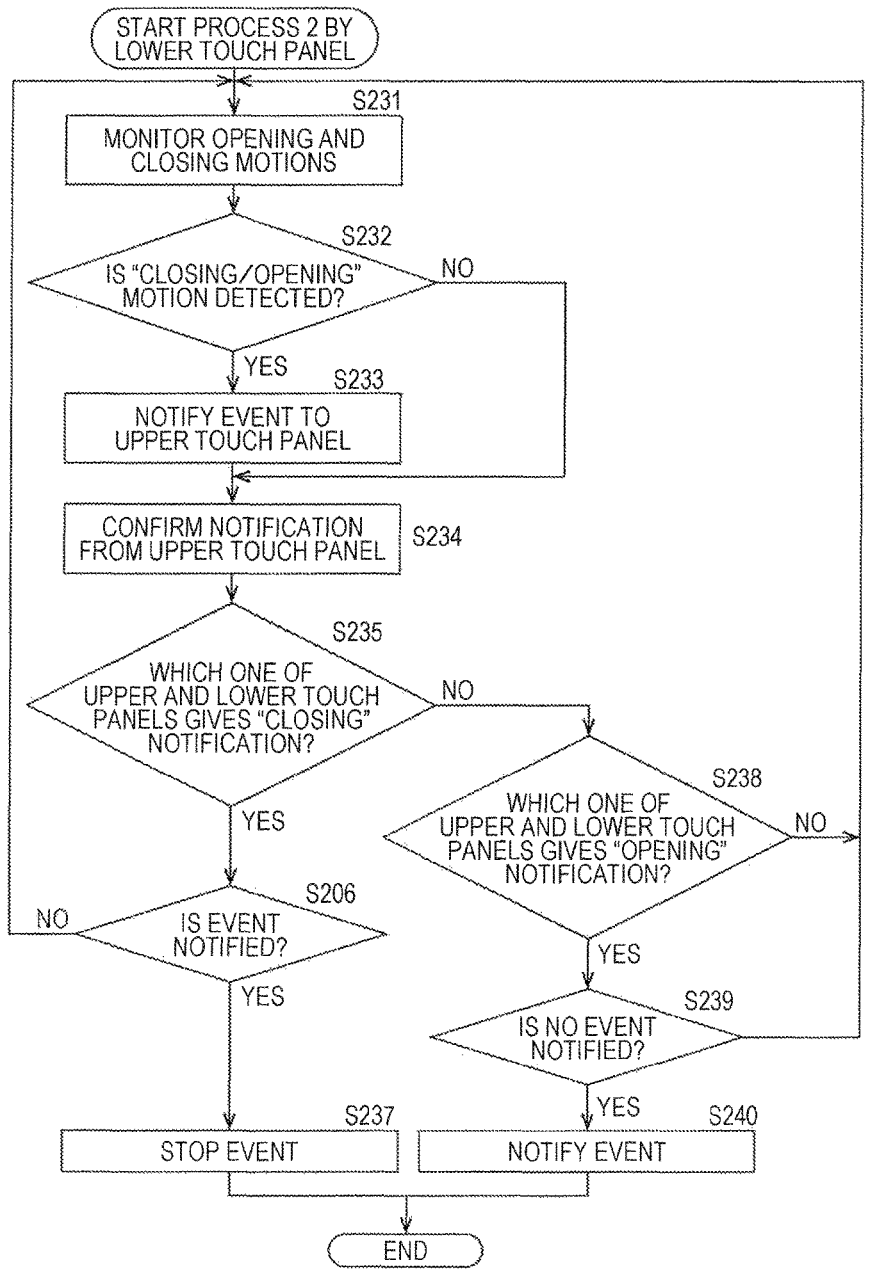
FIG. 19 is a flowchart illustrating a process performed by a touch panel based on the monitored result.

This process is performed in the upper touch panel 11, and the process based on a flowchart illustrated in FIG. 19 is performed in the lower touch panel 12. The processes performed in the lower touch panel 12 are basically similar to the processes performed in the upper touch panel 11, and different processes will be described.

In Step S231, opening and closing motions are monitored. In Step S232, the result of monitoring opening and closing motions is used, and it is determined whether a "closing" or "opening" motion is detected. When it is determined that a motion is detected, the process is advanced to Step S233. In Step S233, the upper touch panel 11 is notified that a motion is detected.

In Step S234, a notification from the upper touch panel 11 is confirmed. In the confirmation, it is confirmed whether a notification is given from the upper touch panel 11. In the case where a notification is given, the content is confirmed. In Step S235, it is determined whether the upper touch panel 11 or the lower touch panel 12 notifies that a "closing" motion is detected. The processes after the process in Step S235 are similarly performed as the processes after the process in Step S205, and the description is omitted.

As described above, the process in the lower touch panel 12 is different only from the process in the upper touch panel 11 in that the upper touch panel 11 is notified and a notification is received from the upper touch panel 11 when a motion is detected, and the other processes are similarly performed.

As described above, both of the upper touch panel 11 and the lower touch panel 12 monitor opening and closing motions, and the process for preventing malfunctions can be performed when one of the touch panels detects opening and closing motions, so that it is possible to detect opening and closing motions much faster and to prevent malfunctions.

Figure 18:
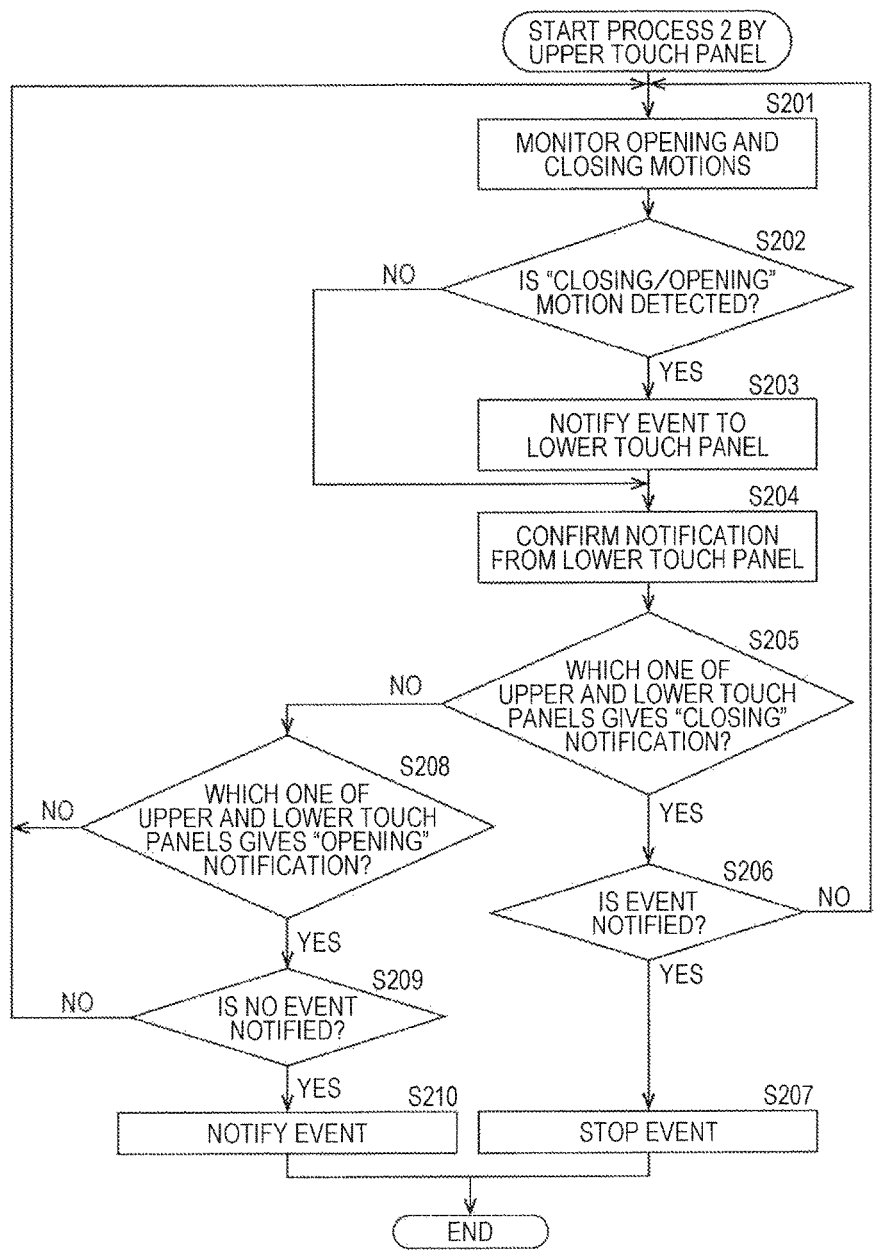
FIG. 18 is a flowchart illustrating a process performed by a touch panel based on the monitored result.

The processes described with reference to FIGS. 18 and 19 are processes including a process in which opening and closing motions are monitored on two surfaces configured of the upper touch panel 11 and the lower touch panel 12, in the case where one touch panel detects a change in the relative position between the two surfaces (in the case where it is detected that an angle formed between the two surfaces is changed), the other touch panel is notified of the detection, after giving a notification, in the case where the two touch panels notify an event to the operating system 91, the two touch panels stop notifying an event to the operating system 91, and in the case where the two touch panels do not notify an event to the operating system 91, the two touch panels notify an event to the operating system 91.

[the Process According to Method 3]

Next, the process according to Method 3 will be described. In Method 3, the upper touch panel 11 monitors opening and closing motions. When an opening or closing motion is detected, the operating system 91 is notified, and the operating system 91 outputs or stops an event. Thus, the upper touch panel 11 and the operating system 91 individually perform different processes. Therefore, first, the process performed by the upper touch panel 11 will be described with reference to a flowchart in FIG. 20.

As similar to Method 1 and Method 2 described above, processes in Step S301 and Step S302 are processes in which opening and closing motions are monitored and it is determined whether an opening or closing motion is detected. In Step S302, in the case where it is determined that a "closing" or "opening" motion is not detected, the process is returned to Step S301, and the processes after that are repeated.

On the other hand, in the case where it is determined that a "closing" or "opening" motion is detected in Step S302, the process is advanced to Step S303. In Step S303, a notification that an opening or closing motion is detected is given to the touch panel driver. The touch panel driver, not illustrated in the drawing, is included in the operating system 91 (FIG. 6). Moreover, the touch panel driver may be provided as two drivers for the upper touch panel 11 and the lower touch panel 12, or may be provided as a single driver shared between the touch panels.

In Step S303, when the touch panel driver is notified, the process is returned to Step S301, and the processes after that are repeated. As described above, the upper touch panel 11 monitors opening and closing motions, and repeats the process in which the detection is notified to the touch panel driver, that is, the detection is notified to the operating system 91, when detecting an opening or closing motion.

Figure 21:
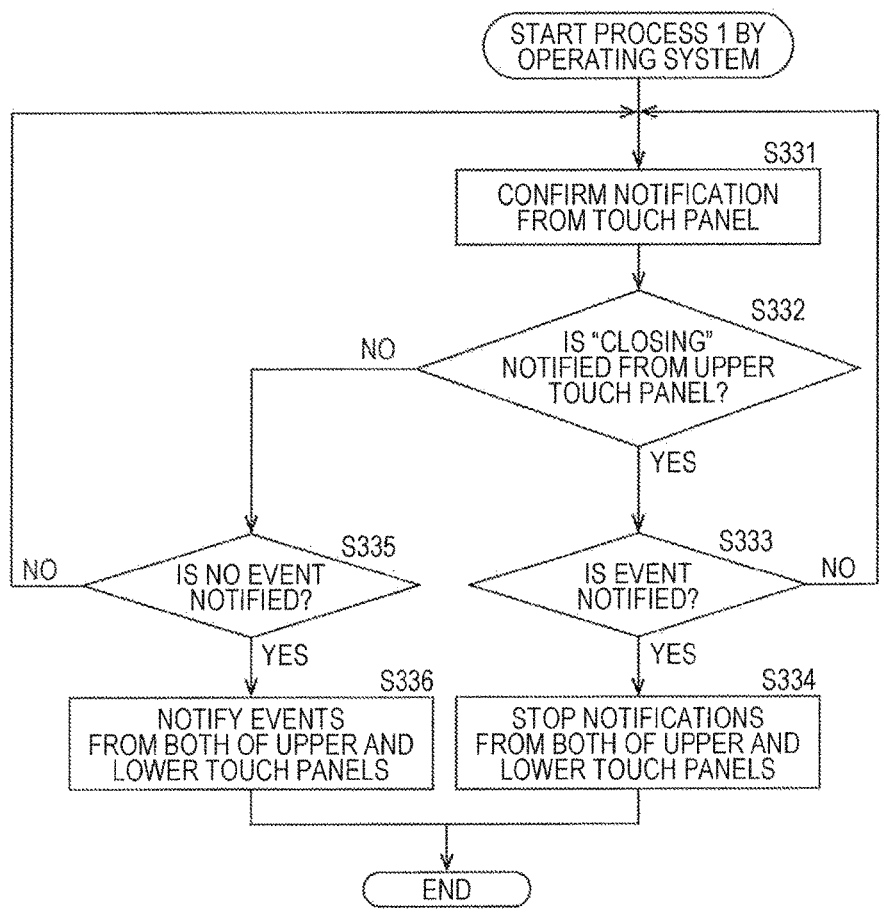
FIG. 21 is a flowchart illustrating a process performed by an operating system based on the monitored result.

The operating system 91 receives a notification from the upper touch panel 11, and performs the process of a flowchart in FIG. 21. In Step S331, a notification from the upper touch panel 11 is confirmed. The confirmation is performed at predetermined intervals, and it is confirmed whether a notification is given from the upper touch panel 11. In the case where a notification is given, the content is confirmed. Alternatively, it may be fine that the content is confirmed when a notification is given from the upper touch panel 11. Here, the description is continued as the content is confirmed when a notification is given from the upper touch panel 11.

In Step S332, it is determined whether the notified content shows that a "closing" motion is detected. In Step S332, in the case where it is determined that a "closing" motion is detected, the process is advanced to Step S333. In Step S333, it is determined whether the state is the state in which an event is notified to the application 92. In the case where it is determined that the state is the state in which an event is notified, the process is advanced to Step S334.

In Step S334, the notification of an event to the application 92 is stopped from the upper touch panel 11 and from the lower touch panel 12. As described above, in the case where a closing state is detected in the state in which an event is notified to the application 92, the operating system 91 stops the operation of notifying an event to the application 92.

On the other hand, in Step S333, in the case where it is determined that an event is not notified to the application 92, since it can be determined that the state is the state in which the notification of an event is already stopped, the process is returned to Step S331, and goes to the process for the subsequent detection. As described above, the state is turned to the state in which an event is not notified to the application 92, so that it can be prevented that the application 92 malfunctions because of a finger touch even though the finger, for example, touches the upper touch panel 11 in the state in which the touch panel is being closed.

On the other hand, in Step S332, in the case where it is determined that a "closing" motion is not detected, the process is advanced to Step S335. In this case, since it is not a "closing" motion, an "opening" motion is detected. In the case where it is determined that an "opening" motion is detected as described above, in Step S335, it is determined whether the state is the state in which an event is not notified to the application 92. In Step S335, in the case where it is determined that the state is the state in which an event is not notified, the process is advanced to Step S336.

In Step S336, the notification of an event to the application 92 is resumed from the upper touch panel 11 and from the lower touch panel 12. As described above, in the case where an opening state is detected in the state in which an event is not notified to the application 92, the operating system 91 resumes the operation of notifying an event to the application 92.

On the other hand, in Step S336, in the case where it is determined that the state is the state in which an event is notified to the application 92, since it can be determined that the state is the state in which the notification of an event is already resumed, the process is returned to Step S331, and goes to the process for the subsequent detection.

As described above, even in the case where the operating system 91 controls outputting or stopping an event to the application 92, it can be prevented that the application 92 malfunctions because of a finger touch as similar to Method 1 and Method 2.

Figure 20:
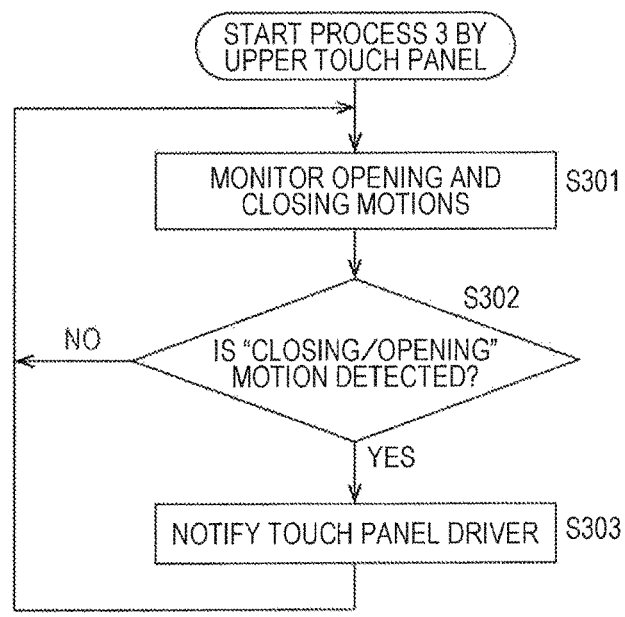
FIG. 20 is a flowchart illustrating a process performed by a touch panel based on the monitored result.

The processes described with reference to FIGS. 20 and 21 are processes including a process in which in the case where at least one touch panel of two surfaces configured of the upper touch panel 11 and the lower touch panel 12 monitors opening and closing motions and the touch panel monitoring opening and closing motions detects a change in the relative position between the two surfaces (a change in an angle formed between the touch panels), the operating system 91 is notified of the detection, in the case where the operating system 91 notifies an event to the application 92, the notification of an event to the application 92 is stopped, and in the case where an event is notified to the application 92, an event is not notified to the application 92.

It is noted that in the case where the lower touch panel 12 monitors opening and closing motions, the process of the flowchart illustrated in FIG. 20 is performed by the lower touch panel 12.

Moreover, in the case of an information processing apparatus 10 including one of the upper touch panel 11 or the lower touch panel 12 (an information processing apparatus 201 described later with reference to FIG. 23, for example), the process for notifying the other touch panel of the detection can be omitted when the touch panel monitoring opening and closing motions detects a change in the relative position between the two surfaces. The present technique is also applicable to an embodiment like this.

[the Process According to Method 4]

Next, the process according to Method 4 will be described. In Method 4, both of the upper touch panel 11 and the lower touch panel 12 monitor opening and closing motions, in which when an opening or closing motion is detected, the operating system 91 is notified, and the operating system 91 outputs or stops an event.

The processes performed by the upper touch panel 11 and the lower touch panel 12 are similarly performed as the process of the flowchart illustrated in FIG. 20, and the detailed descriptions are omitted. Namely, both of the upper touch panel 1 and the lower touch panel 12 monitor opening and closing motions, and repeat the process in which the operating system 91 (the touch panel driver) is notified when an opening or closing motion is detected.

Figure 22:
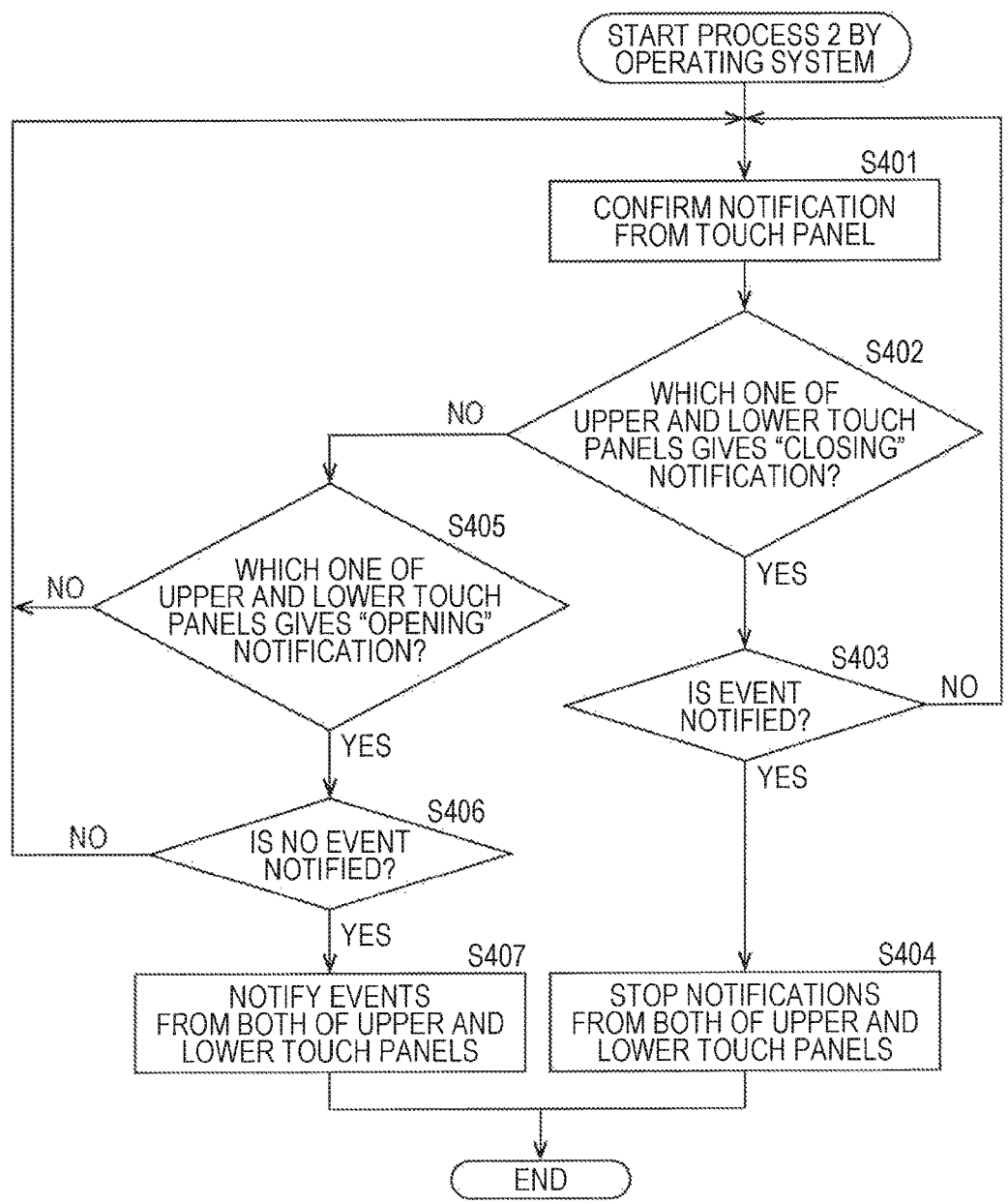
FIG. 22 is a flowchart illustrating a process performed by the operating system based on the monitored result.

The operating system 91 receives a notification from the upper touch panel 12, and performs the process of the flowchart in FIG. 22. In Step S401, a notification from the upper touch panel 11 or the lower touch panel 12 is confirmed. The confirmation is performed at predetermined intervals, and it is confirmed whether the upper touch panel 11 or the lower touch panel 12 gives a notification. In the case where a notification is given, the content is confirmed.

In Step S402, it is determined whether the upper touch panel 11 or the lower touch panel 12 notifies that a "closing" motion is detected. In the case where it is determined that a notification is given that a "closing" motion is detected, the process is advanced to Step S403. In Step S403, it is determined whether the state is the state in which an event is notified to the application 92. In the case where it is determined that the state is the state in which an event is notified, the process is advanced to Step S404.

In Step S404, the notification of an event to the application 92 is stopped from the upper touch panel 11 and from the lower touch panel 12. As described above, in the case where a closing state is detected in at least one of the upper touch panel 11 and the lower touch panel 12 in the state in which an event is notified to the application 92, the operating system 91 stops the operation of notifying an event to the application 92.

On the other hand, in Step S403, in the case where it is determined that an event is not notified to the application 92, since it can be determined that the state is the state in which the notification of an event is already stopped, the process is returned to Step S401, and goes to the process for the subsequent detection. As described above, the state is turned to the state in which an event is not notified to the application 92, so that it can be prevented that the application 92 malfunctions because of a finger touch even though the finger, for example, touches the upper touch panel 11 in the closing state.

On the other hand, in Step S402, in the case where it is determined that the upper touch panel 11 or the lower touch panel 12 does not notify that a "closing" motion is detected, the process is advanced to Step S405. In Step S405, it is determined whether the upper touch panel 11 or the lower touch panel 12 notifies that an "opening" motion is detected.

In Step S405, in the case where it is determined that an "opening" motion is detected from the upper touch panel 11 or the lower touch panel 12, the process is advanced to Step S406. In Step S406, it is determined whether the state is the state in which an event is not notified to the application 92. In the case where it is determined that the state is the state in which an event is not notified, the process is advanced to Step S407.

In Step S407, the notification of an event to the application 92 is resumed from the upper touch panel 11 and from the lower touch panel 12. As described above, in the case where an opening state is detected in at least one of the upper touch panel 11 and the lower touch panel 12 in the state in which an event is not notified to the application 92, the operating system 91 resumes the operation of notifying an event to the application 92.

On the other hand, in Step S406, in the case where it is determined that the state is the state in which an event is notified to the application 92, since it can be determined that the state is the state in which the notification of an event is already resumed, the process is returned to Step S401, and goes to the process for the subsequent detection.

Moreover, in Step S405, in the case where it is determined that the upper touch panel 11 or the lower touch panel 12 does not notify that an "opening" motion is detected, the process is returned to Step S401, and the processes after that are repeated. In this case, since the state is such that neither a "closing" motion nor an "opening" motion is detected from both of the upper touch panel 11 and the lower touch panel 12, the process is returned to Step S401, and the processes after that are repeated.

As described above, it can be prevented that the application 92 malfunctions because of a finger touch even in the case where the operating system 91 controls outputting or stopping an event to the application 92, as similar to Methods 1 to 3.

The processes described with reference to FIGS. 20 and 22 are processes including a process in which in the case where two surfaces configured of the upper touch panel 11 and the lower touch panel 12 monitor opening and closing motions and one of the two touch panels detects a change in the relative position between the two surfaces (a change in an angle formed between the touch panels), the operating system 91 is notified of the detection, in the case where an event is notified to the application 92, the operating system 91 stops notifying an event to the application 92, and in the case where an event is not notified to the application 92, the operating system 91 notifies an event to the application 92.

[Other Forms]

In the foregoing embodiment, the information processing apparatus 10 is taken and described as an example in which the information processing apparatus 10 includes two touch panels configured of the upper touch panel 11 and the lower touch panel 12 and is vertically opened and closed. However, the present technique is not applied only to this information processing apparatus 10. For example, the present technique can also be applied to such an information processing apparatus that is laterally opened and closed and includes touch panels on the left side and the right side when opened. The foregoing embodiment can be applied by only changing the vertical direction to the lateral direction.

Figure 23:
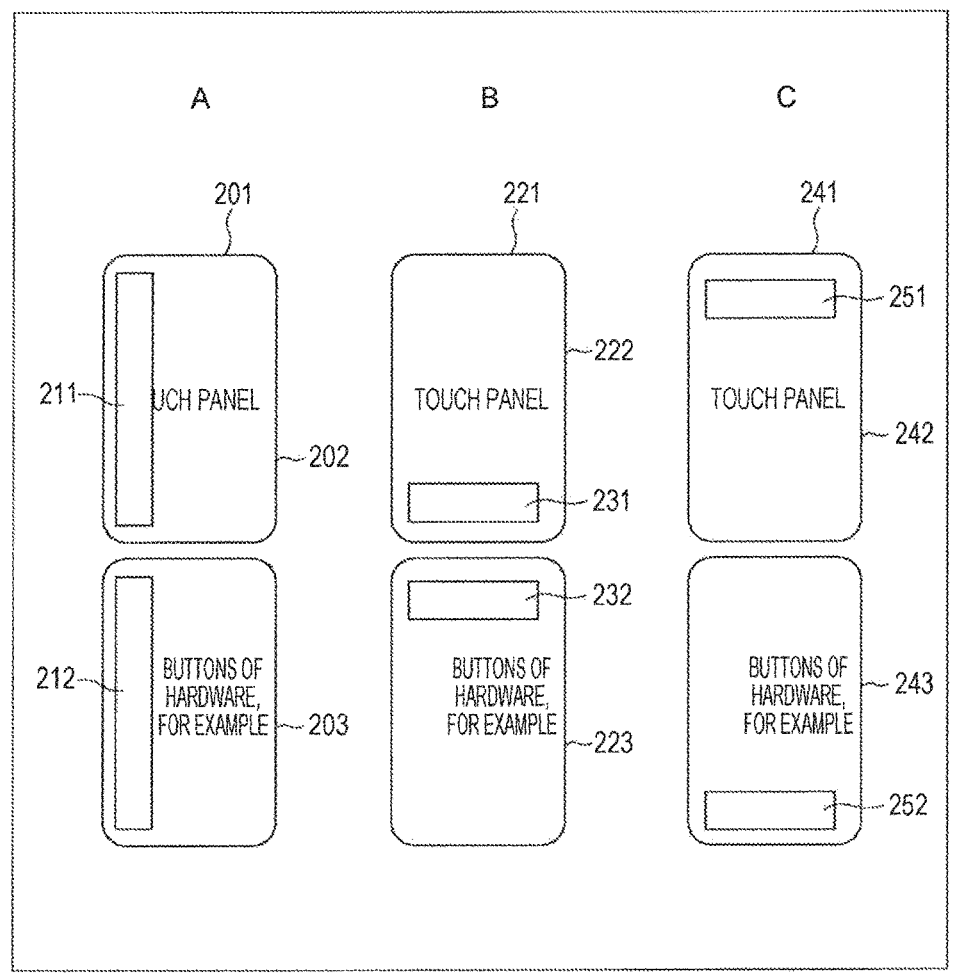
FIG. 23 is a diagram illustrating another form of an information processing apparatus.

Moreover, the present technique can also be applied to a device including a single touch panel as illustrated in FIG. 23. The information processing apparatus 201 illustrated in A in FIG. 23 includes a touch panel 202 on the upper side and a manipulating unit 203 configured of buttons, for example, of hardware on the lower side. A predetermined region 211 of the touch panel 202 reacts with a predetermined region 212 of the manipulating unit 203.

The region 211 is a region including sensors that detect a contacting state when contacting the region 212. The region 212 is a region including a material that reacts with the sensors in the region 211. It can be configured to perform the processes for monitoring opening and closing motions illustrated in FIGS. 14 and 15 using sensor values obtained when the sensors in the region 211 react with the material in the region 212.

Furthermore, the region 211 illustrated in A in FIG. 23 is provided on the left side in the touch panel 202. However, the region 211 may be provided as a region 231 on the lower side in a touch panel 222 as an information processing apparatus 221 illustrated in B in FIG. 23. In this case, the region 212 is also provided as a region 232 on the upper side of a manipulating unit 223. Also in this case, it can be configured to perform the processes for monitoring opening and closing motions illustrated in FIGS. 14 and 15 using sensor values in the region 231.

In addition, it may be configured to provide a region 251 on the upper side in a touch panel 242 as an information processing apparatus 241 illustrated in C in FIG. 23. In this case, a region 252 is provided on the lower side of a manipulating unit 243. Also in this case, it can be configured to perform the processes for monitoring opening and closing motions illustrated in FIGS. 14 and 15 using sensor values in the region 251.

As described above, the present technique can be applied when the sensors that detect reactions are provided and the material to react with the sensors is provided at positions opposite to the sensors.

Moreover, as illustrated in A to C in FIG. 23, the region to monitor opening and closing motions may be provided at any positions. This is similarly applied also in the foregoing embodiment. For example, as illustrated in B in FIG. 3, the region 21 may be vertically provided as the region 211 illustrated in A in FIG. 23, not provided laterally on the lower side in the upper touch panel 11. In the case where the region is vertically provided, the region may be provided in the center or the right side, not limited to the left side in the touch panel 202 as illustrated in A in FIG. 23.

The position relationship between the region 231 and the region 232 illustrated in B in FIG. 23 is the same as the position relationship between the region 21 and the region 22 of the information processing apparatus 10 illustrated in B in FIG. 3. As described above, in the case where the region 231 is provided on the lower side in the touch panel 222, it is suited to detecting the closing motion specifically.

As similar to providing the region 251 on the upper side in the touch panel 242 as illustrated in C in FIG. 23, the region 21 illustrated in B in FIG. 3 may be provided on the upper side in the upper touch panel 11. As described above, in the case where the region 251 is provided on the upper side in the touch panel 242, it is suited to detecting the opening motion specifically.

Furthermore, the region provided with sensors that detect reactions is not limited to a single region in a single touch panel. For example, it may be fine that as illustrated in B in FIG. 23, the region is provided on the lower side of the touch panel as well as the region is also provided on the upper side of the touch panel as illustrated in C in FIG. 23. As described above, in the case where two regions are provided, the foregoing processes for monitoring opening and closing motions are performed in the individual regions. Alternatively, such a configuration may be possible in which the targets for monitoring are separated as the region provided on the upper side mainly monitors the opening motion and the region provided on the lower side mainly monitors the closing motion, for example.

In addition, a region may be provided for dedicatedly monitoring opening and closing motions. For example, it may be fine that a dedicated region corresponding to the region 211, for example, is provided on a part of the frame around the upper touch panel 11 of the information processing apparatus 10 and a region corresponding to the region 212 is provided on a part of the frame around the lower touch panel 12 at a position corresponding to the region.

Moreover, in the foregoing embodiment, the information processing apparatus 10 vertically opened and closed is taken and described as an example. The opening and closing are the opening and closing in the direction in which an angle formed between the upper touch panel 11 and the lower touch panel 12 is changed. However, the application of the present technique is not limited only to a device opened and closed as described above. For example, the present technique can also be applied to a device including a top surface and a lower surface in which one of the surfaces slides in the vertical direction or in the lateral direction with respect to the other surface and the top surface and the lower surface are in the usable state.

For example, the foregoing processes for monitoring opening and closing motions are performed on a touch panel provided on the lower surface. When the top surface slides to the lower surface, sensors on the touch panel react accordingly, so that the opening and closing motions can be detected as similar to the foregoing embodiment by detecting the reactions. However, in this case, changes in sensor values on a plurality of lines in the sliding direction are monitored, and opening and closing motions are detected.

It should be noted that embodiments of the present technique are not limited to the above described embodiments, and various modifications may be made to them without departing from the scope of the present technique.

It is noted that the present technique can also include the following configuration.

(1)

An information processing apparatus including at least two surfaces, in which a relative position between one surface and the other surface of the two surfaces is changed, the information processing apparatus including:

a detecting unit configured to detect that a relative position between the two surfaces is changed, from a change in electrostatic capacitance values of a plurality of electrostatic capacitance sensors included in a predetermined region of at least one surface of the two surfaces.

(2)

The information processing apparatus according to aspect (1), in which the detecting unit detects that a relative position between the two surfaces is changed by determining whether the change is a change in which electrostatic capacitance values of the electrostatic capacitance sensors tend to increase or a change in which values from the sensors tend to reduce.

(3)

The information processing apparatus according to aspect (1), in which a relative position between the two surfaces being changed is detected by calculating a differential value between a first electrostatic capacitance value acquired at a predetermined timing and a second electrostatic capacitance value acquired at a subsequent timing individually for the electrostatic capacitance sensors, further calculating a sum total of the calculated differential values, and determining whether a value of the sum total tends to increase or tends to reduce.

(4)

The information processing apparatus according to any one of aspects (1) to (3), in which the detecting unit detects that a relative position between the two surfaces is changed by determining whether a number of the electrostatic capacitance sensors whose electrostatic capacitance value is increased is increasing or a number of the electrostatic capacitance sensors whose electrostatic capacitance value is reduced is increasing.

(5)

The information processing apparatus according to any one of aspects (1) to (4), in which the detecting unit detects that a relative position between the two surfaces is changed by calculating a differential value between a first electrostatic capacitance value acquired at a predetermined timing and a second electrostatic capacitance value acquired at a subsequent timing individually for the electrostatic capacitance sensors, further calculating a difference between a maximum differential value and a minimum differential value, and determining whether the difference is in a predetermined range.

(6)

The information processing apparatus according to any one of aspects (1) to (5), in which the detecting unit detects that a relative position between the two surfaces is changed by calculating a differential value between a first electrostatic capacitance value acquired at a predetermined timing and a second electrostatic capacitance value acquired at a subsequent timing individually for the electrostatic capacitance sensors and determining whether a number of the sensors whose differential value is increased or reduced is a predetermined value or more.

(7)

The information processing apparatus according to any one of aspects (1) to (6), in which a surface including the predetermined region of the two surfaces is configured of a touch panel.

(8)

The information processing apparatus according to aspect (7), in which when an event is notified from the touch panel to an operating system in detecting a change in a relative position between the two surfaces by the detecting unit, the event from the touch panel to the operating system is stopped, and when an event is not notified from the touch panel to the operating system, the event is notified from the touch panel to the operating system.

(9)

The information processing apparatus according to aspect (7), in which when an event from the touch panel is notified from an operating system to an application in detecting a change in a relative position between the two surfaces by the detecting unit, the event from the operating system to the application is stopped, and when an event from the touch panel is not notified from the operating system to the application, the event is notified from the operating system to the application.

(10)

The information processing apparatus according to aspect (1), in which the two surfaces are individually configured of a touch panel; at least one touch panel includes the predetermined region; when the detecting unit of the touch panel including the predetermined region detects a change in a relative position between the two surfaces, the other touch panel is notified of the detection; when the two touch panels individually notify an event to an operating system, the event to the operating system is stopped; and when the two touch panels do not notify an event to the operating system, the event is notified to the operating system.

(11)

The information processing apparatus according to aspect (1), in which the two surfaces are individually configured of a touch panel; the two touch panels individually include the predetermined region; when the detecting unit of one of the touch panels detects a change in a relative position between the two surfaces, the other touch panel is notified of the detection; when the two touch panels individually notify an event to an operating system, the event to the operating system is stopped; and when the two touch panels do not notify an event to the operating system, the event is notified to the operating system.

(12)

The information processing apparatus according to aspect (1), in which the two surfaces are individually configured of a touch panel; at least one touch panel includes the predetermined region; when the detecting unit of the touch panel including the predetermined region detects a change in a relative position between the two surfaces, an operating system is notified of the detection; when the operating system notifies an event to an application, the event to the application is stopped; and when the operating system does not notify an event to the application, the event is notified to the application.

(13)

The information processing apparatus according to aspect (1), in which the two surfaces are individually configured of a touch panel; the two touch panels individually include the predetermined region; when the detecting unit of one of the two touch panels detects a change in a relative position between the two surfaces is detected, an operating system is notified of the detection; when the operating system notifies an event to an application, the event to the application is stopped; and when the operating system does not notify an event to the application, the event is notified to the application.

(14)

An information processing method for an information processing apparatus including at least two surfaces, in which a relative position between one surface and the other surface of the two surfaces is changed, the information processing method including the step of:

detecting that a relative position between the two surfaces is changed, from a change in electrostatic capacitance values of a plurality of electrostatic capacitance sensors included in a predetermined region of at least one surface of the two surfaces.

(15)

A computer readable program causing a computer that controls an information processing apparatus including at least two surfaces, in which a relative position between one surface and the other surface of the two surfaces is changed, to perform a process including the step of:

detecting that a relative position between the two surfaces is changed, from a change in electrostatic capacitance values of a plurality of electrostatic capacitance sensors included in a predetermined region of at least one surface of the two surfaces.

(16)

A recording medium on which a computer readable program is recorded, the program causing a computer that controls an information processing apparatus including at least two surfaces, in which a relative position between one surface and the other surface of the two surfaces is changed, to perform a process including the step of:

detecting that a relative position between the two surfaces is changed, from a change in electrostatic capacitance values of a plurality of electrostatic capacitance sensors included in a predetermined region of at least one surface of the two surfaces.

REFERENCE SIGNS LIST

10 Information processing apparatus
11 Upper touch panel
12 Lower touch panel
13 Display
14 Display

The invention claimed is:

1. An information processing apparatus including at least two surfaces, in which a relative position between one surface and another surface of the two surfaces is changed, the information processing apparatus comprising:
   circuitry configured to
      detect that a relative position between the two surfaces is changed, from a change in electrostatic capacitance values of a plurality of electrostatic capacitance sensors included in a predetermined region of at least one surface of the two surfaces, and
      prevent notification of an event to an operating system whenever the relative position between the two surfaces is detected to change according to a closing motion based on differential detection of a movement of the two surfaces toward one another,
   wherein the event includes determining one or more coordinate values of contact indicating one or more touches on a touch panel of one or more of the at least two surfaces, and
   wherein the differential detection of the movement comprises detecting a change from a first angle between the two surfaces at a first timing to a second angle between the two surfaces at a second timing subsequent to the first timing.

2. The information processing apparatus according to claim 1, wherein the circuitry is further configured to detect that the relative position between the two surfaces is changed by determining whether the electrostatic capacitance values of the electrostatic capacitance sensors increase or reduce.

3. The information processing apparatus according to claim 1, wherein the relative position between the two surfaces being changed is detected by calculating a differential value between a first electrostatic capacitance value acquired at the first timing and a second electrostatic capacitance value acquired at the second timing individually for each one of the plurality of electrostatic capacitance sensors, further calculating a sum total of the calculated differential values, and determining whether a value of the sum total increases or reduces.

4. The information processing apparatus according to claim 1, wherein the detecting unit detects that a relative position between the two surfaces is changed by determining whether a number of the electrostatic capacitance sensors whose electrostatic capacitance value is increased is increasing or a number of the electrostatic capacitance sensors whose electrostatic capacitance value is reduced is increasing.

5. The information processing apparatus according to claim 1, wherein the detecting unit detects that a relative position between the two surfaces is changed by calculating a differential value between a first electrostatic capacitance value acquired at a predetermined timing and a second electrostatic capacitance value acquired at a subsequent timing individually for the electrostatic capacitance sensors, further calculating a difference between a maximum differential value and a minimum differential value, and determining whether the difference is in a predetermined range.

6. The information processing apparatus according to claim 1, wherein the circuitry is further configured to detect that the relative position between the two surfaces is changed by calculating a differential value between a first electrostatic capacitance value acquired at the first timing and a second electrostatic capacitance value acquired at the second timing individually for each one of the plurality of electrostatic capacitance sensors and determining whether a number of the plurality of electrostatic capacitance sensors whose differential value is increased is a predetermined value or more.

7. An information processing method for an information processing apparatus including at least two surfaces, in which a relative position between one surface and the other surface of the two surfaces is changed, the information processing method comprising:
   detecting that a relative position between the two surfaces is changed, from a change in electrostatic capacitance values of a plurality of electrostatic capacitance sensors included in a predetermined region of at least one surface of the two surfaces; and
   preventing notification of an event to an operating system whenever the relative position between the two surfaces is detected to change according to a closing motion based on differential detection of a movement of the two surfaces toward one another,
   wherein the event includes determining one or more coordinate values of contact indicating one or more touches on a touch panel of one or more of the at least two surfaces, and
   wherein the differential detection of the movement comprises detecting a change from a first angle between the two surfaces at a first timing to a second angle between the two surfaces at a second timing subsequent to the first timing.

8. A non-transitory computer readable storage medium having embodied thereon a program, which when executed by a computer to execute a method that controls an information processing apparatus including at least two surfaces, in which a relative position between one surface and the other surface of the two surfaces is changed, wherein the method comprises:
   detecting that a relative position between the two surfaces is changed, from a change in electrostatic capacitance values of a plurality of electrostatic capacitance sensors included in a predetermined region of at least one surface of the two surfaces; and
   preventing notification of an event to an operating system whenever the relative position between the two surfaces is detected to change according to a closing motion based on differential detection of a movement of the two surfaces toward one another,
   wherein the event includes determining one or more coordinate values of contact indicating one or more touches on a touch panel of one or more of the at least two surfaces, and
   wherein the differential detection of the movement comprises detecting a change from a first angle between the two surfaces at a first timing to a second angle between the two surfaces at a second timing subsequent to the first timing.

9. A non-transitory computer-readable storage medium having embodied thereon a program, which when executed by a computer, causes the computer to execute a method that controls an information processing apparatus including at least two surfaces, in which a relative position between one surface and the other surface of the two surfaces is changed, wherein the method comprises:
   detecting that a relative position between the two surfaces is changed, from a change in electrostatic capacitance values of a plurality of electrostatic capacitance sensors included in a predetermined region of at least one surface of the two surfaces;
   preventing notification of an event to an operating system whenever the relative position between the two surfaces is detected to change according to a closing motion based on differential detection of a movement of the two surfaces toward one another, wherein the event includes determining one or more coordinate values of contact indicating one or more touches on a touch panel of one or more of the at least two surfaces; and notifying the event to the operating system when the relative position between the two surfaces is detected to change according to an opening motion, wherein the differential detection of the movement comprises detecting a change from a first angle between the two surfaces at a first timing to a second angle between the two surfaces at a second timing subsequent to the first timing.

* * * * *